(12) United States Patent
Liu et al.

(10) Patent No.: US 11,233,614 B2
(45) Date of Patent: Jan. 25, 2022

(54) DISCOVERY REFERENCE SIGNALS IN NARROWBAND COMMUNICATIONS

(71) Applicant: QUALCOMM Incorporated, San Diego, CA (US)

(72) Inventors: Chih-Hao Liu, San Diego, CA (US); Srinivas Yerramalli, San Diego, CA (US); Tamer Kadous, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/385,929

(22) Filed: Apr. 16, 2019

(65) Prior Publication Data
US 2019/0327047 A1    Oct. 24, 2019

Related U.S. Application Data

(60) Provisional application No. 62/659,688, filed on Apr. 18, 2018.

(51) Int. Cl.
*H04L 5/00* (2006.01)
*H04W 56/00* (2009.01)

(52) U.S. Cl.
CPC ......... *H04L 5/0048* (2013.01); *H04W 56/001* (2013.01)

(58) Field of Classification Search
CPC ..... H04L 5/0048; H04L 5/0044; H04L 5/005; H04L 25/0202; H04L 27/2613; H04L 27/2692; H04L 5/0094; H04L 25/0226; H04L 27/26; H04L 5/00; H04L 5/0007; H04L 5/001; H04L 5/0012; H04L 5/0023; H04L 5/0035; H04L 5/0039; H04L 5/0046; H04L 5/0053; H04L 5/0092; H04L 5/0098; H04W 16/14; H04W 48/16; H04W 56/001; H04W 56/0015; H04W 48/10; H04W 48/12; H04W 52/0216; H04W 72/0446; H04W 72/1289; H04W 8/005;

(Continued)

(56) References Cited

U.S. PATENT DOCUMENTS

2016/0234707 A1* 8/2016 Kazmi ................. H04W 76/28

OTHER PUBLICATIONS

Huawei et al: "Reduction of NB-IoT Synchronization Time," 3GPP Draft; R1-1803877, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018, XP051426171, 8 pages, Retrieved from the Internet: URL: http://www.3gpp.org/ftp/Meetings%5F3GPP%5FSYNC/RAN1/Docs/ [retrieved on Apr. 15, 2018] pp. 1-6.

(Continued)

*Primary Examiner* — Natasha W Cosme
(74) *Attorney, Agent, or Firm* — Arent Fox, LLP

(57) ABSTRACT

A method and a system for narrowband wireless communication is disclosed. The base station constructs a DRS comprising a first set of contiguous NPSS subframes followed by a second set of contiguous repeating NSSS subframes. The DRS may further comprise a third set of NSSS subframes followed by a fourth set of NPSS subframes. The base station may apply a cover code to symbols of the NPSS subframes. The base station transmits the NPSS/NSSS subframes as part of a DRS subframe on an anchor channel.

30 Claims, 15 Drawing Sheets

(58) Field of Classification Search
CPC ....... H04W 4/023; H04W 4/70; H04W 68/02; H04W 72/042; H04W 72/044; H04W 72/1273; H04W 74/02; H04W 74/0808; H04W 74/085; H04W 76/11
See application file for complete search history.

(56) References Cited

OTHER PUBLICATIONS

International Search Report and Written Opinion—PCT/US2019/027882—ISA/EPO—dated Apr. 24, 2019.
Lenovo., et al., "Views on TDD Downlink Aspect for R.15 NBIoT," 3GPP TSG RAN WG1 Meeting #90bis, R1-1717440, Prague, P.R. Czech Oct. 9-13, 2017 (Oct. 13, 2017), 5 pages.
LG Electronics: System Information Acquisition time Enhancement in NB-IoT , 3GPP Draft; R1-1704851 NB-IoT Si Enhancement Final, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017, Apr. 2, 2017, XP051242986, 6 Pages, Retrieved from the Internet: URL: http://www.3gpp.org/ftp/Meetings_3GPP_SYNC/RAN1/Docs/ [retrieved on Apr. 2, 2017] the whole document.

\* cited by examiner

FIG. 5

DISCOVERY REFERENCE SIGNALS IN NARROWBAND COMMUNICATIONS

CROSS-REFERENCE TO RELATED APPLICATION

This application claims the benefit of U.S. Provisional Patent Application Ser. No. 62/659,688, entitled "Discovery Reference Signals in Narrowband Communications," filed on Apr. 18, 2018, which is expressly incorporated by reference herein in its entirety.

BACKGROUND

Technical Field

The present disclosure relates generally to communication systems and to a discovery reference signal (DRS) configured for narrowband communications.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by the Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Narrowband communications involve communicating with a limited frequency bandwidth as compared to the frequency bandwidth used for LTE communications. Thus, narrowband communication may involve unique challenges due to the limited frequency bandwidth.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Narrowband communications involve communicating with a limited frequency bandwidth as compared to the frequency bandwidth used, e.g., for LTE communications. One example of narrowband communication is narrowband Internet-of-Things (NB-IoT) communication, which may be limited to a single resource block (RB) of system bandwidth, e.g., 180 kHz. NB-IoT communication may reduce device complexity, enable multi-year battery life, and provide deeper coverage to reach challenging locations such as deep inside buildings.

An anchor channel may be used to carry DRS (e.g., a narrowband primary synchronization signal (NPSS), a narrowband secondary synchronization signal (NSSS), a narrowband physical broadcast control channel (NPBCH), SIB bandwidth reduced (SIB-BR), etc.). The NPSS and the NSSS may be used by a UE for initial synchronization, cell acquisition, timing estimation, and/or frequency estimation. Further, the anchor channel may be used to indicate a frequency hopping configuration that includes the anchor channel and a plurality of non-anchor hopping channels that may be used to communicate DL data and UL data.

However, because NB-IoT UEs may be located deep within a building (e.g., smart gas meters, smart water meters, etc.), a DRS that includes a small number of NPSS and/or NSSS may not be properly received due to, among others, the attenuation of the DRS prior to reaching the UE. Consequently, the UE may experience a synchronization delay. When a synchronization delay occurs, the UE may not be able to receive DL data and/or send UL data, which reduces the quality of service (QoS) and consumes an undesirable amount of battery power.

In NB-IoT, synchronization signals for UEs may be carried on DRS that are transmitted using one RB, e.g., based on European Telecommunications Standard Institute (ETSI) regulations. In another example, DRS for UEs may be transmitted using three RBs, e.g., based on United States (US) Federal Communications Commission (FCC) regulations. NB-IoT communication may reduce device complexity, enable multi-year battery life, and provide deeper coverage to reach challenging locations such as deep inside buildings. However, detecting DRS using a three RB (e.g., 540 KHz) communication bandwidth and/or a single RB (e.g., 180 kHz) communication bandwidth operating in the unlicensed frequency spectrum may be difficult.

Thus, aspects presented herein provide a flexible mechanism that increases the UE's chance of properly receiving the NPSS and/or the NSSS through the DRS in both US and EU.

The present disclosure provides a solution by transmitting the NPSS and the NSSS using a synchronization signal repetition pattern in order to increase the detection probability for the DRS, so that synchronization and/or cell acquisition may be achieved with a reduced number of visits to the anchor channel, thereby reducing synchronization delay and increasing the QoS. The present disclosure provides a DRS signal structure that may increase the probability of successful detection, may decrease the probability of false detection, while also providing a common DRS signal structure for UEs operating in different locations, e.g. in different countries such as the United States and European countries.

In an aspect of the disclosure, a method, a computer-readable medium, and an apparatus are provided. In one example, the apparatus may be a base station. In certain configurations, the apparatus may construct a DRS comprising a first set of contiguous NPSS subframes followed by a second set of contiguous NSSS subframes. The DRS may further comprise a third set of additional NSSS subframes followed by a fourth set of additional NPSS subframes. The apparatus may apply a cover code to all of the symbols of the NPSS subframes. The apparatus may transmit the NPSS/NSSS subframes as part of a DRS subframe on an anchor channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 shows an example cover code that may be applied to the OFDM symbols of the NPSS subframes to aid a UE in acquiring the DRS on the anchor channel in accordance with certain aspects of the disclosure.

DETAILED DESCRIPTION

Figure 1:
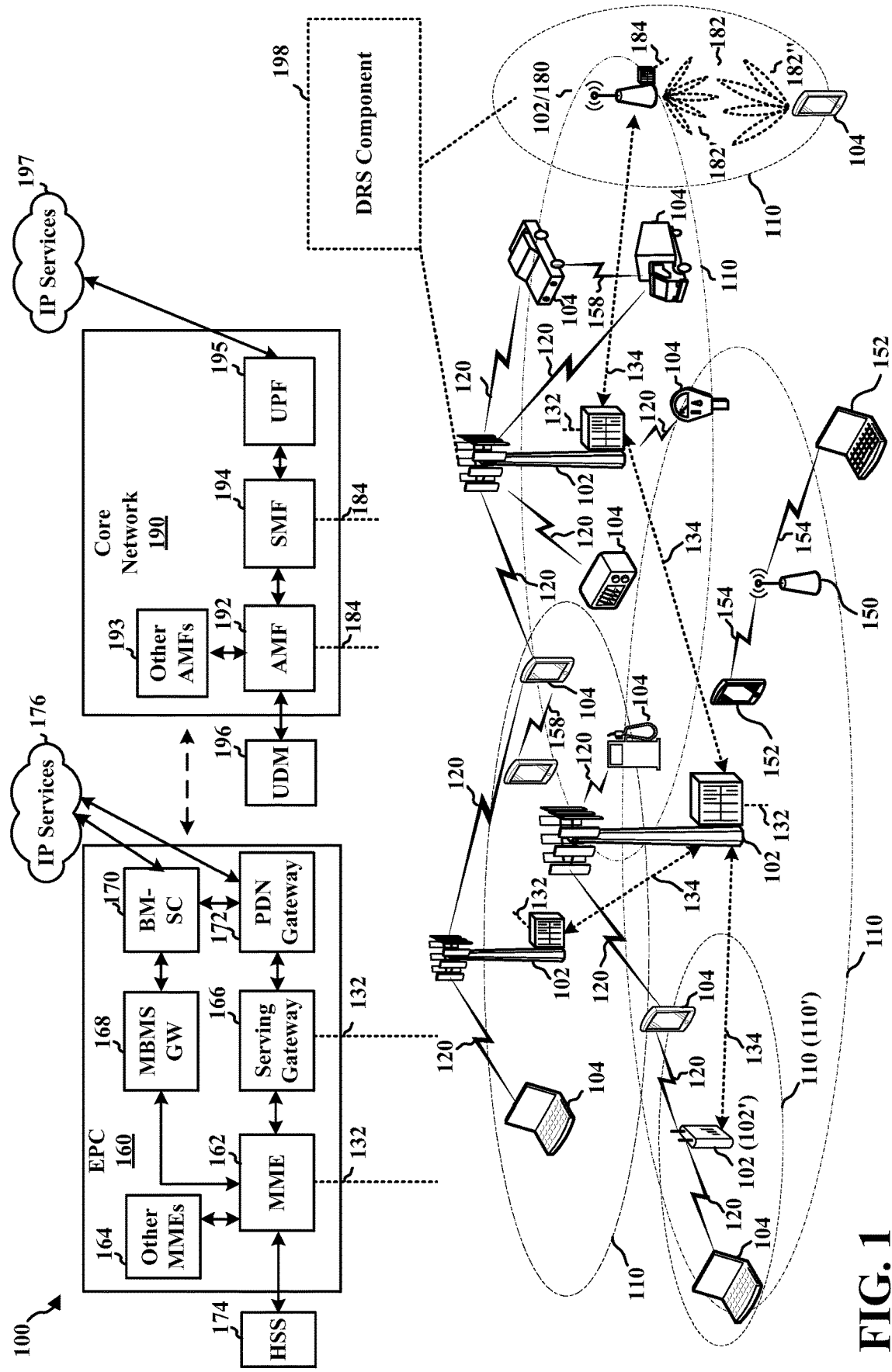
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102/180 may be configured to manage one or more aspects of wireless communication via construction and transmission of DRS including a plurality of NPSS subframes and a plurality of NSSS subframes. For example, the base station 102/180 of FIG. 1 includes a DRS component 198 configured to construct a Discovery Reference Signal (DRS) including a first set of contiguous NPSS subframes followed by a second set of contiguous repeating NSSS subframes, and transmit the DRS on an anchor channel, as described below in connection with any of FIGS. 2A to 10.

Although the following description may provide examples based on EU regulations and US regulations, it should be appreciated that the concepts described herein may be applicable to additional or alternative locations. For example, any of the techniques disclosed herein for constructing and transmitting a DRS may be applied to a UE operating in the US, operating in the EU, and/or operating in any other location. Thus, while the following description describes constructing and transmitting a first DRS for a UE operating under EU regulations and constructing and transmitting a second DRS for a UE operating under US regulations, it should be appreciated that either DRS may be constructed and transmitted by a UE operating in either location and/or a UE operating in any other appropriate location.

As well, although the following description may be focused on LTE, the concepts described herein may be applicable to other similar areas, such as 5G NR, LTE-A, CDMA, GSM, and other wireless technologies.

Figure 2A:
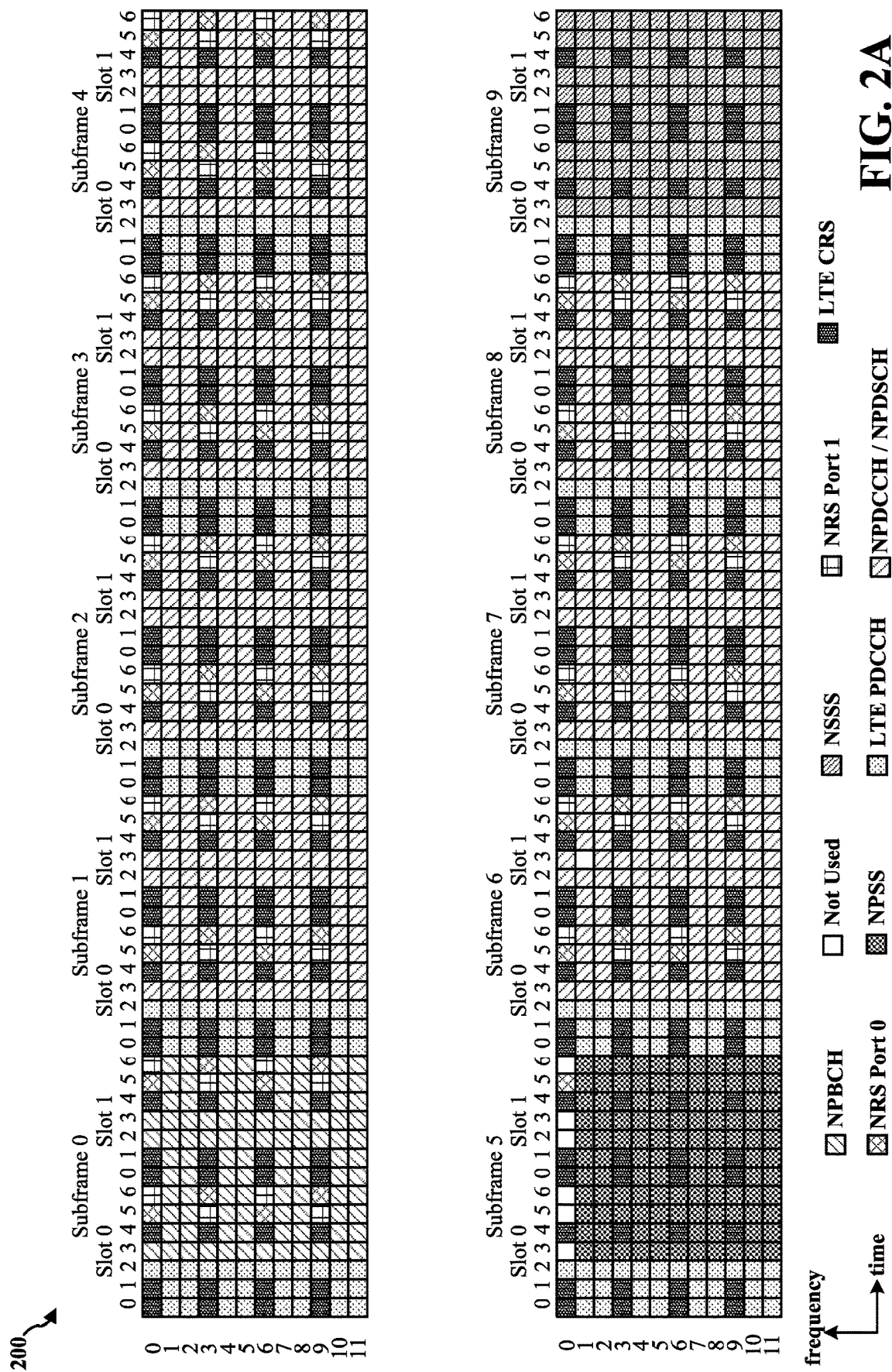
FIGS. 2A, 2B, 2C, and 2D are diagrams illustrating examples of an NB frame structure for in-band deployment inside an LTE carrier (even radio frame), an NB frame structure for in-band deployment inside an LTE carrier (odd radio frame), an NB frame structure for guard band/standalone deployment inside an LTE carrier (even radio frame), and an NB frame structure for guard band/standalone deployment inside an LTE carrier (even radio frame), respectively.
Figure 2B:
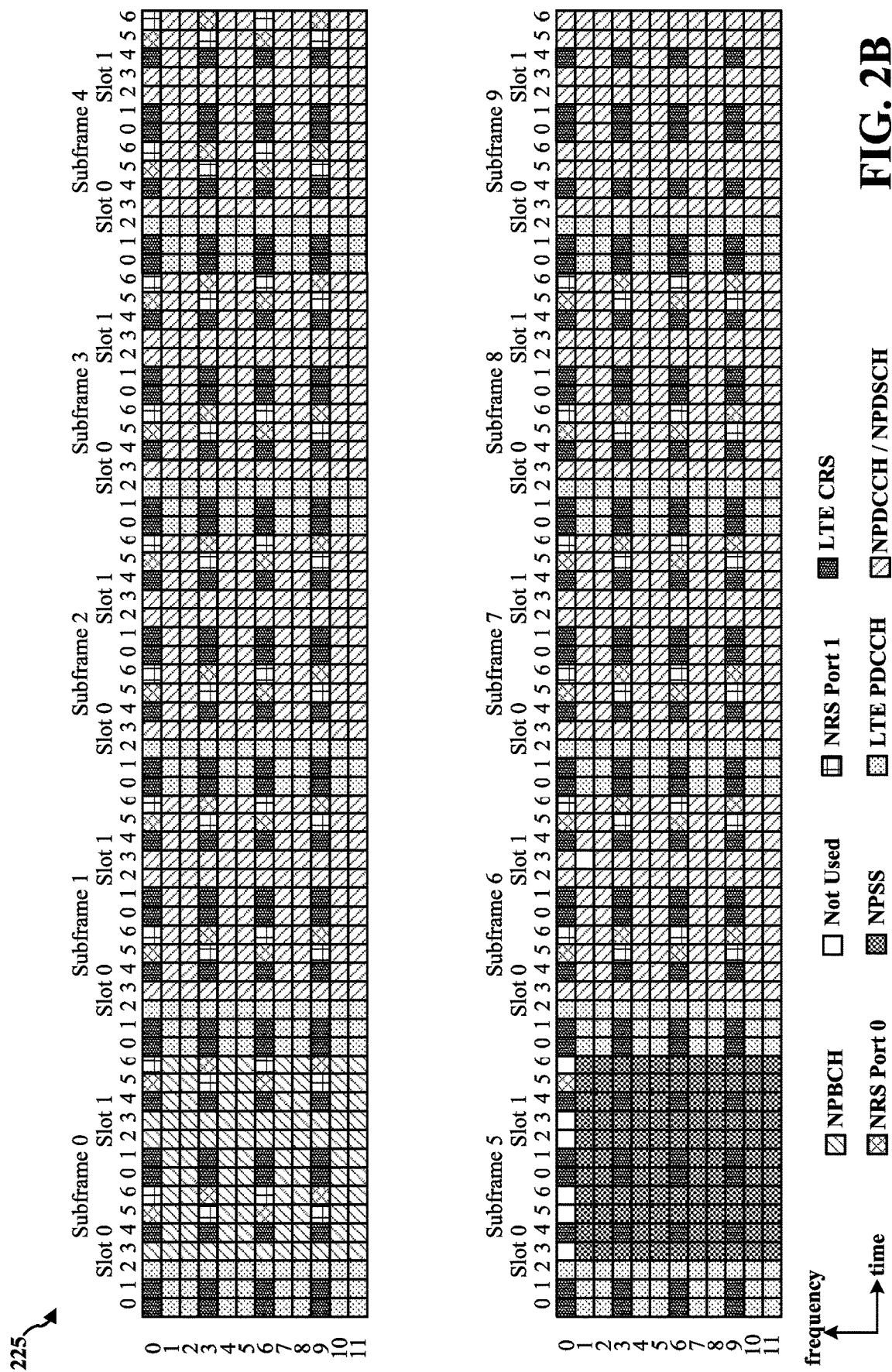
Figure 2C:
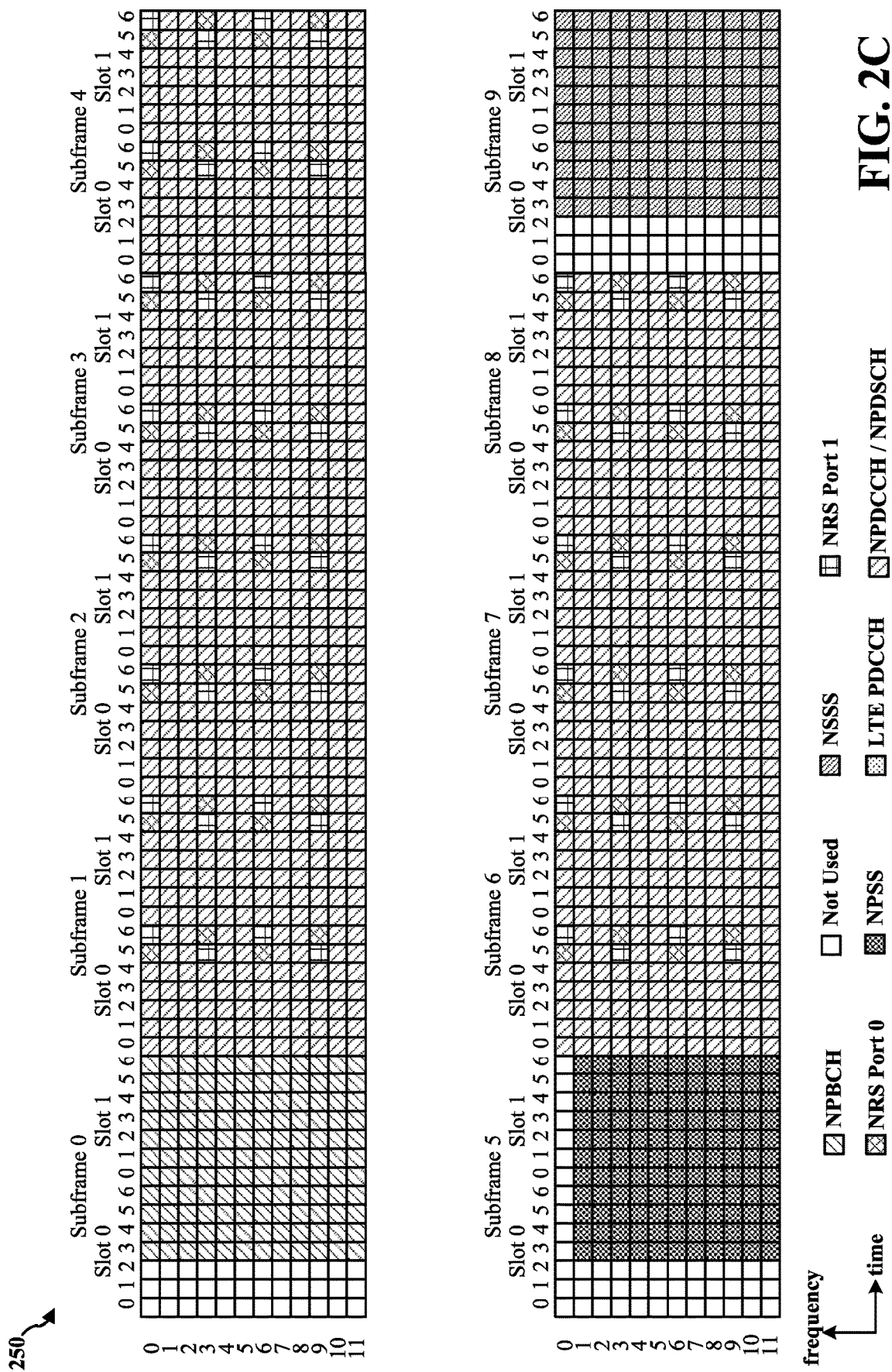
Figure 2D:
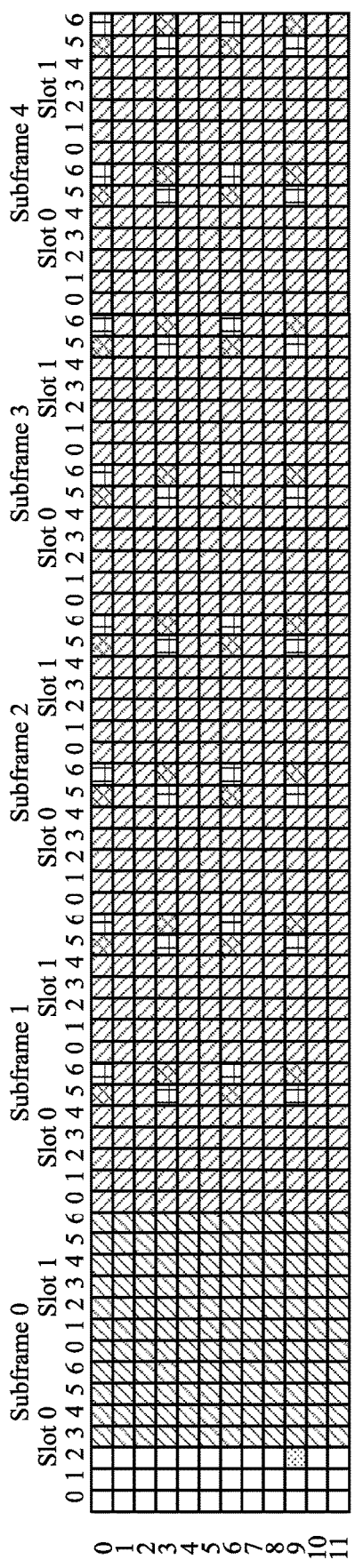
Figure 2D:
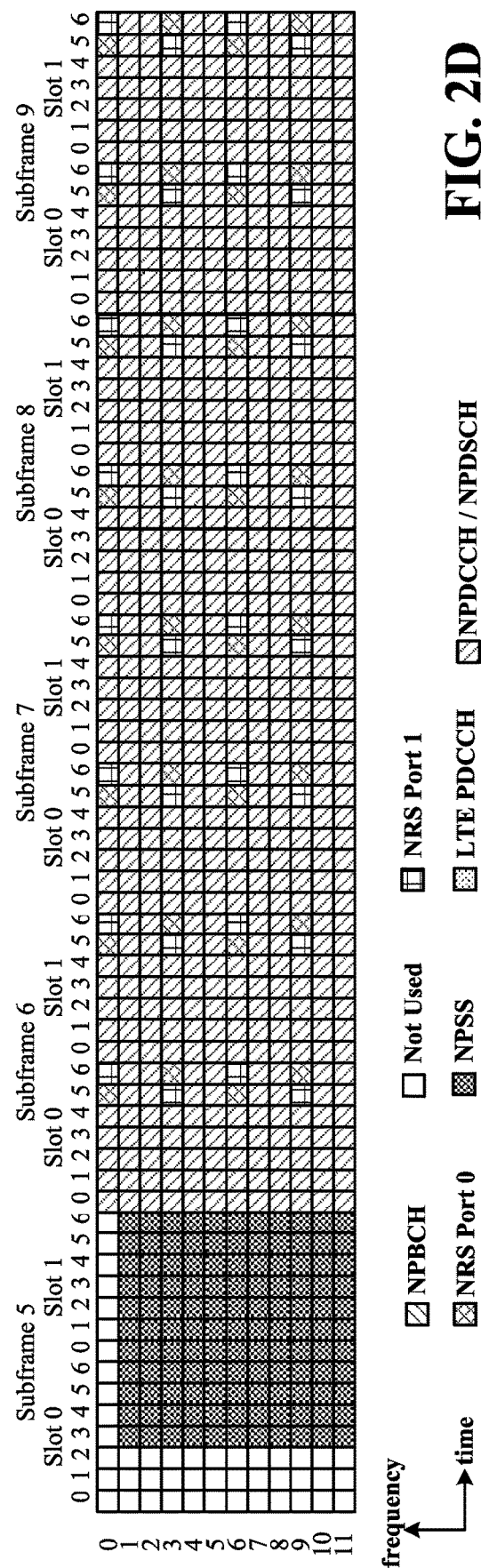

FIG. 2A is a diagram 200 illustrating an example of an NB frame structure for in-band deployment inside an LTE carrier (even radio frame). FIG. 2B is a diagram 225 illustrating an example of an NB frame structure for in-band deployment inside an LTE carrier (odd radio frame). FIG. 2C is a diagram 250 illustrating an example of an NB frame structure for guard band/standalone deployment inside an LTE carrier (even radio frame). FIG. 2D is a diagram 275 illustrating an example of an NB frame structure for guard band/standalone deployment inside an LTE carrier (even radio frame). Other wireless communication technologies may have a different frame structure and/or different channels. A radio frame (10 ms) may be divided into 10 equally sized subframes (e.g., subframe 0-subframe 9). Each subframe may include two consecutive time slots (e.g., slot 0 and slot 1). A resource grid may be used to represent the two time slots, each time slot including one or more time concurrent RBs (also referred to as physical RBs (PRBs)) of 180 kHz. The resource grid is divided into multiple resource elements (REs). For a normal cyclic prefix, an RB may contain 12 consecutive subcarriers in the frequency domain and 7 consecutive symbols (for DL, orthogonal frequency-division multiplexing (OFDM) symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme. The in-band deployment of NB-IoT may utilize RBs within an LTE carrier. The guard band deployment of NB-IoT may utilize the unused RBs within an LTE carrier's guard-band. The stand-alone deployment of NB- IoT may utilize RBs within the global system for mobile communications (GSM) carriers.

As illustrated in FIGS. 2A to 2D, some of the REs in each of the subframes carry NB reference signals (NRS) that may be used for broadcast transmission(s) or dedicated DL transmission(s), regardless of whether data is actually transmitted. Depending on the transmission scheme, NRS may be transmitted on one antenna port or on two antenna ports (e.g., antenna port 0 and antenna port 1). The values of the NRS may be similar to cell-specific reference signals (CRS) in LTE. NRS may indicate an NB cell identifier (NCellID), while LTE CRS may indicate a physical cell identifier (PCI). For the in-band deployment, the LTE CRS may also be transmitted in subframes which are not used for MBSFN, as illustrated in FIGS. 2A and 2B. Although the structure of the NRS and the LTE CRS may not overlap, the CRS may be taken into account for rate matching and RE mapping purposes. DL transmissions may not use the REs allocated for NRS and/or LTE CRS.

For initial synchronization and in order to determine the NCellID, an NB primary synchronization signal (NPSS) may be transmitted in subframe 5 of even and odd radio frames, and an NB secondary synchronization signal (NSSS) may be transmitted in subframe 9 in even radio frames. Using in-band deployment, the first three OFDM symbols in each of subframe 5 and subframe 9 may carry the LTE physical downlink control channel (PDCCH), and hence, the first three OFDM symbols in subframes 5 and 9 may not carry NPSS and NSSS, as illustrated in FIGS. 2A and 2B. NPSS and the NSSS may be punctured by LTE CRS in the in-band deployment. Using the guard band deployment and/or standalone deployment, the first three OFDM symbols in each of subframe 5 and subframe 9 may be unused, and hence, the first three OFDM symbols in subframes 5 and 9 may not carry the NPSS and NSSS, as illustrated in FIGS. 2C and 2D.

The NB physical broadcast channel (NPBCH) may carry the NB master information block (NB-MIB). After physical layer baseband processing, the resulting NB-MIB may be split into eight blocks. The first block may be transmitted in subframe 0 of each radio frame in a set of eight consecutive radio frames. The second block may be transmitted in subframe 0 of each radio frame in the subsequent set of eight consecutive radio frames. The process of NB-MIB block transmission may be continued until the entire NB-MIB is transmitted. By using subframe 0 for all NB-MIB block transmissions, collisions between the NPBCH and a potential LTE MBSFN transmission may be avoided when the in-band deployment of NB-IoT is used. As illustrated in FIGS. 2A and 2B, NPBCH symbols may be mapped around the NRS and the LTE CRS for the in-band deployment. As illustrated in FIGS. 2C and 2D, the NPBCH may occupy all of subframe 0 except for the first three symbols which are left unused for the guard band deployment and/or standalone deployment.

The principle of a control channel and a shared channel also applies to NB-IoT, defining the NB physical downlink control channel (NPDCCH) and the NB physical downlink shared channel (NPDSCH). Not all subframes may be used for the transmission of dedicated DL channels. In RRC signaling, a bitmap indicating the valid subframes for NPDCCH and/or NPDSCH may be signaled to the UE. When a subframe is not indicated as valid, an NPDCCH and/or NPDSCH may be postponed until the next valid subframe. The NPDCCH may indicate which UEs have data located in the NPDSCH, where to find the data, and how often the data is repeated. UL grants that indicate REs allocated to a UE for UL data transmission(s) may also be located in the NPDCCH. The NPDCCH may also carry paging and/or system information updates. NPDCCH symbols and NPDSCH symbols may be mapped around the NRS, and for the in-band deployment of NB-IoT, also around the LTE CRS.

Figure 3:
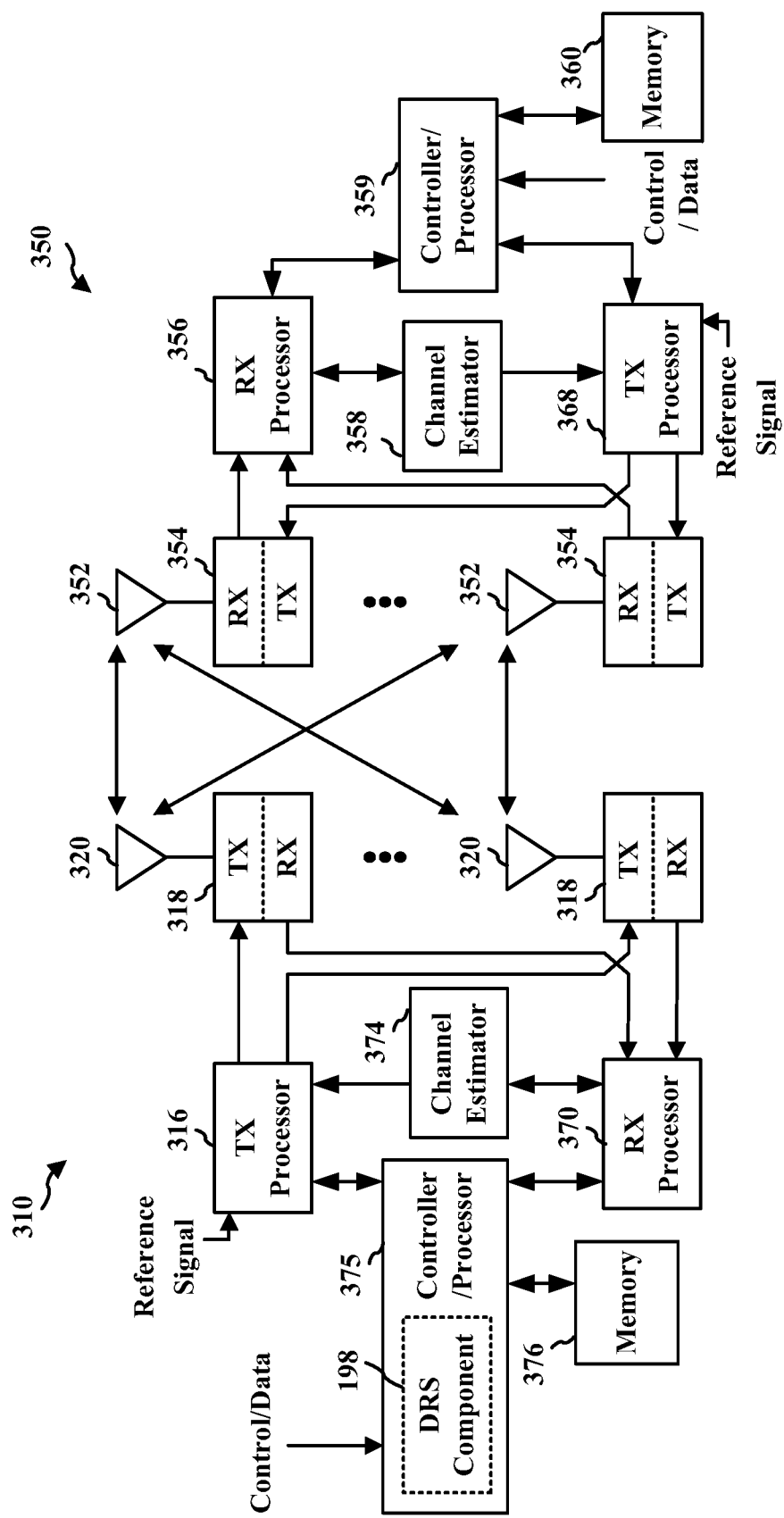
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and/or the controller/processor 375 may be configured to perform aspects described in connection with the DRS component 198 in FIG. 1. For example, the controller/processor 375 may, in some cases, execute stored instructions to instantiate the DRS component 198 configured to construct a Discovery Reference Signal (DRS) including a first set of contiguous NPSS subframes followed by a second set of contiguous repeating NSSS subframes, and to transmit the DRS on an anchor channel, as described in connection with any of FIGS. 1, 2A to 2D, and/or 4 to 10.

Narrowband communications involve communicating with a limited frequency bandwidth as compared to the frequency bandwidth used for LTE communications. One example of narrowband communication is NB-IoT communication, which may be limited to a single RB of system bandwidth, e.g., 180 kHz. NB-IoT communication may reduce device complexity, enable multi-year battery life, and provide deeper coverage to reach challenging locations such as deep inside buildings.

However, supporting narrowband communication may be difficult due to certain power spectral density (PSD) restrictions (e.g., transmission power restrictions) and bandwidth requirements (e.g., NB-IoT) that use the unlicensed frequency spectrum (e.g., 5 GHz unlicensed frequency spectrum, the sub-2.4 GHz unlicensed frequency spectrum, or the sub-GHz unlicensed frequency spectrum, etc.). For example, under FCC regulations in the US, the maximum path loss for NB-IoT communication is 161 dB with a maximum effective isotropic radiated power (EIRP) of 36 dBm from a base station antenna. Under ETSI regulations in Europe, the maximum path loss for NB-IoT communication is 154 dB with a maximum EIRP of 29 dBm from a base station antenna.

Coverage enhancements, such as frequency hopping, for narrowband devices (e.g., UEs and/or base stations) may be employed to provide more reliable communications within a narrowband communication system, and to overcome the PSD restrictions and bandwidth requirements for narrowband communications that use the unlicensed frequency spectrum.

For example, a UE and/or a base station may perform frequency hopping by monitoring, receiving, and/or transmitting signals by switching a carrier among different frequency channels (e.g., an anchor channel and a plurality of non-anchor hopping channels) to exploit the frequency diversity of the unlicensed frequency spectrum.

An anchor channel may be used to carry DRS (e.g., a narrowband primary synchronization signal (NPSS), a narrowband secondary synchronization signal (NSSS), a narrowband physical broadcast control channel (NPBCH), SIB bandwidth reduced (SIB-BR), etc.). The NPSS and the NSSS may be used by a UE for initial synchronization, cell acquisition, timing estimation, and/or frequency estimation. Further, the anchor channel may be used to indicate a frequency hopping configuration that includes the anchor channel and a plurality of non-anchor hopping channels that may be used to communicate DL data and UL data.

Under a first set of regulations, such as in Europe under ETSI regulations, NB-IoT DRS may be transmitted using an anchor channel of one RB. To achieve the target maximum path loss of 154 dB with a maximum EIRP of 29 dBm, the operating SNR for the one-RB anchor channel may be −8.5 dB. Under a second set of regulations, e.g., under FCC regulations in the US, NB-IoT DRS might be transmitted using an anchor channel of three RBs. To achieve the target maximum path loss of 161 dB with a maximum EIRP of 36 dBm, the operating SNR for the three-RB anchor channel may be −13.27 dB per RB. The difference in SNR of 4.77 dB per RB between the two sets of regulations may be due to the spread of the DRS over 3 RB in the second set of regulations. Thus, receiver sensitivity for the detection of DRS under the second set of regulations may be 4.77 dB better.

After a number of hops, e.g., K hops, between non-anchor hopping channels, the UE may return to the anchor channel to monitor for DRS in order to reduce synchronization delay. However, because NB-IoT UEs may be located deep within a building (e.g., smart gas meters, smart water meters, etc.), a DRS that includes a small number of NPSS and/or NSSS may not be properly received due to, among others, the attenuation of the DRS prior to reaching the UE. Consequently, the UE may experience a synchronization delay. When a synchronization delay occurs, the UE may not be able to receive DL data and/or send UL data, which reduces the quality of service (QoS) and consumes an undesirable amount of battery power.

Figure 4A:
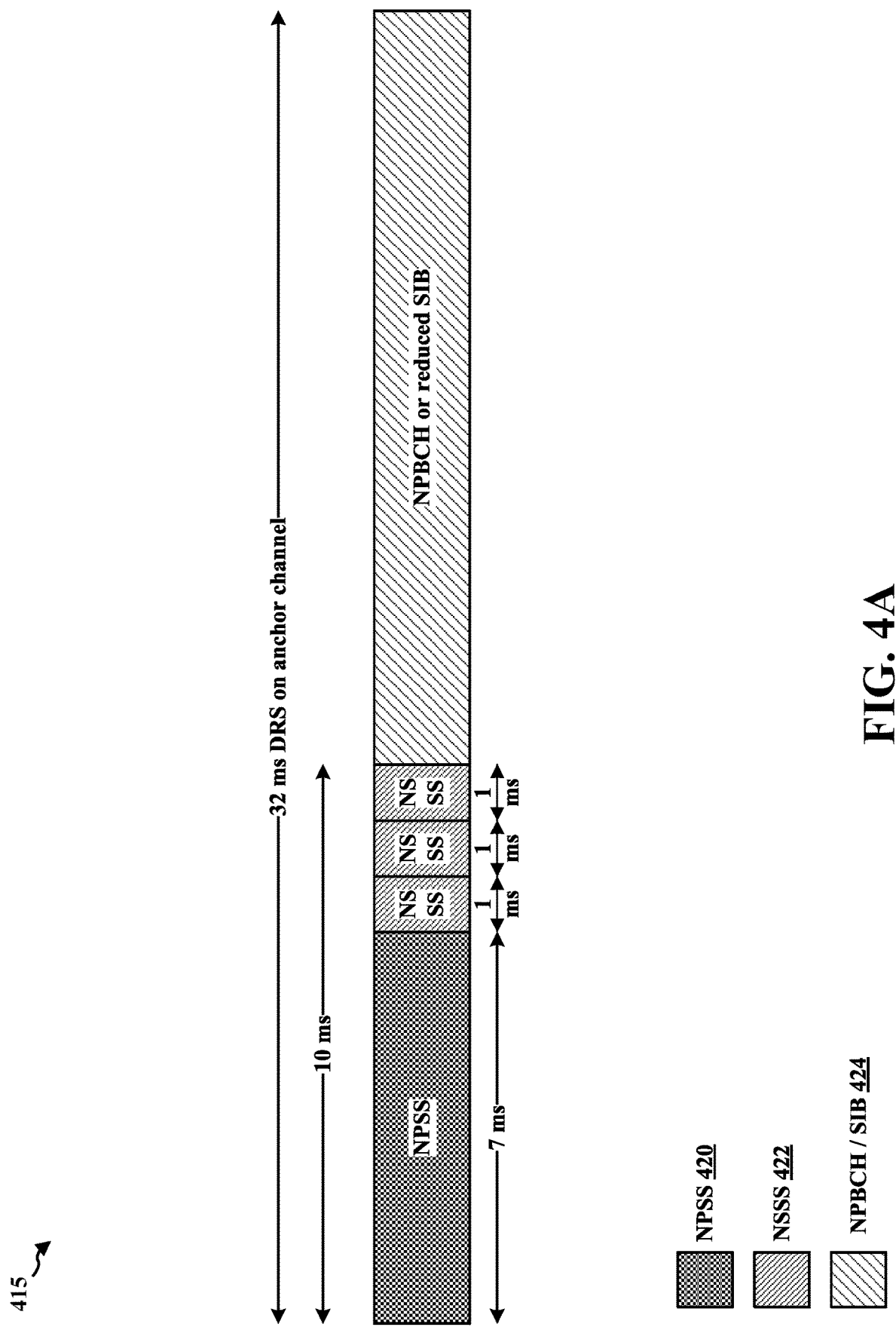
FIG. 4A illustrates an example 32 ms DRS on an anchor channel for operation in EU including 7 ms NPSS subframes and 3 ms NSSS subframes that may be used to transmit narrowband synchronization signals between a base station and a UE in accordance with certain aspects of the disclosure.

FIG. 4A illustrates an example 32 ms DRS on an anchor channel for operation under the first example set of regulations, showing 7 ms NPSS subframes and 3 ms NSSS subframes that may be used to transmit narrowband synchronization signals between a base station and a UE in accordance with certain aspects of the disclosure. Although the following description describes the concept using the example of a 10 ms NPSS/NSSS block of subframes including 7 ms NPSS subframes and 3 ms NSSS subframes, it should be appreciated that the example quantity of subframes are for illustrative purposes and that the techniques disclosed herein may additionally or alternatively apply to different quantities of subframes. For example, the concepts may be similarly applied to a DRS that includes a 10 ms NPSS/NSSS block of subframes including a first set of NPSS subframes (e.g., 8 contiguous NPSS subframes, etc.) and a second set of NSSS subframes (e.g., 2 contiguous NSSS subframes, etc.).

The anchor channel may be used to carry DRS (e.g., NPSS, NSSS, NPBCH, SIB-BR, etc.). The NPSS and the NSSS may be used by the UE for initial synchronization, cell acquisition, timing estimation, and/or frequency estimation. Following the transmission of the anchor channel may be non-anchor or data channels used to carry DL data or UL data for narrowband communication. The anchor channel may be repeated periodically after a certain number of non-anchor channels to allow the UE to periodically re-perform timing and frequency estimation. The non-anchor channels may be frequency hopped to mitigate interference. The anchor channel may also be used to carry information that indicates the frequency hopping pattern to the UE.

It may be desired for a long dwell period in each frequency hop on non-anchor channels to accommodate long control and data channel repetitions for the target modulation and coding scheme. For example, the dwell time for a frequency hop may be 160 ms operating in the second set of regulations. Under the first set of regulations, the dwell time for a frequency hop may be 320 ms, or up to 640 ms. Due to the long dwell time, it may be desirable for a "one-shot" NPSS/NSSS acquisition in order to reduce synchronization delay. It may also be desirable to have a common NPSS/NSSS signal structure for the two sets of regulations to allow a single UE design to operate in both markets. As used herein, the term "'one-shot' NPSS/NSSS acquisition" refers to a UE that performs NPSS/NSSS acquisition using one DRS rather than, for example, combining with other DRS instances.

In one aspect, to increase the probability of the one-shot NPSS/NSSS acquisition, the number of OFDM symbols in an NPSS subframe or an NSSS subframe may be increased from 12 to 14. Increasing the number of OFDM symbols may be achieved by using the two OFDM symbols that may be reserved in an LTE subframe for NPSS/NSSS subframes. In one aspect, multiple NPSS/NSSS subframes may be repeated in DRS to increase the detection probability for a single DRS, so that one-shot NPSS/NSSS acquisition may be achieved, or at least the NPSS/NSSS acquisition may be achieved using as few anchor channels as possible. FIG. 4A shows an example 32 ms DRS 415 on an anchor channel for EU in which 10 ms of NPSS/NSSS subframes are transmitted at the beginning of the DRS. In particular, the example DRS 415 of FIG. 4A starts with 7 contiguous NPSS subframes 420 followed by 3 contiguous NSSS subframes 422. The 10 ms NPSS/NSSS subframes block may then be followed by 22 ms of NPBCH or reduced SIB data 424 for the remaining subframes of the 32 ms DRS 415. Following the subframes of the DRS 415 may be non-anchor channels or data channels that are frequency hopped to carry DL data or UL data. As discussed, under the first set of regulations, to achieve the target maximum path loss of 154 dB with a maximum EIRP of 29 dBm, the operating SNR for the one-RB anchor channel may be −8.5 dB. Increasing the number of OFDM symbols in the NPSS/NSSS subframe block from 12 to 14 combined OFDM symbols with the 7 repetitions of NPSS subframes and 3 repetitions of NSSS subframes in the example DRS 415 of FIG. 4A increases the probability that the one-shot NPSS/NSSS acquisition may be achieved at the SNR of −8.5 dB.

Figure 4B:
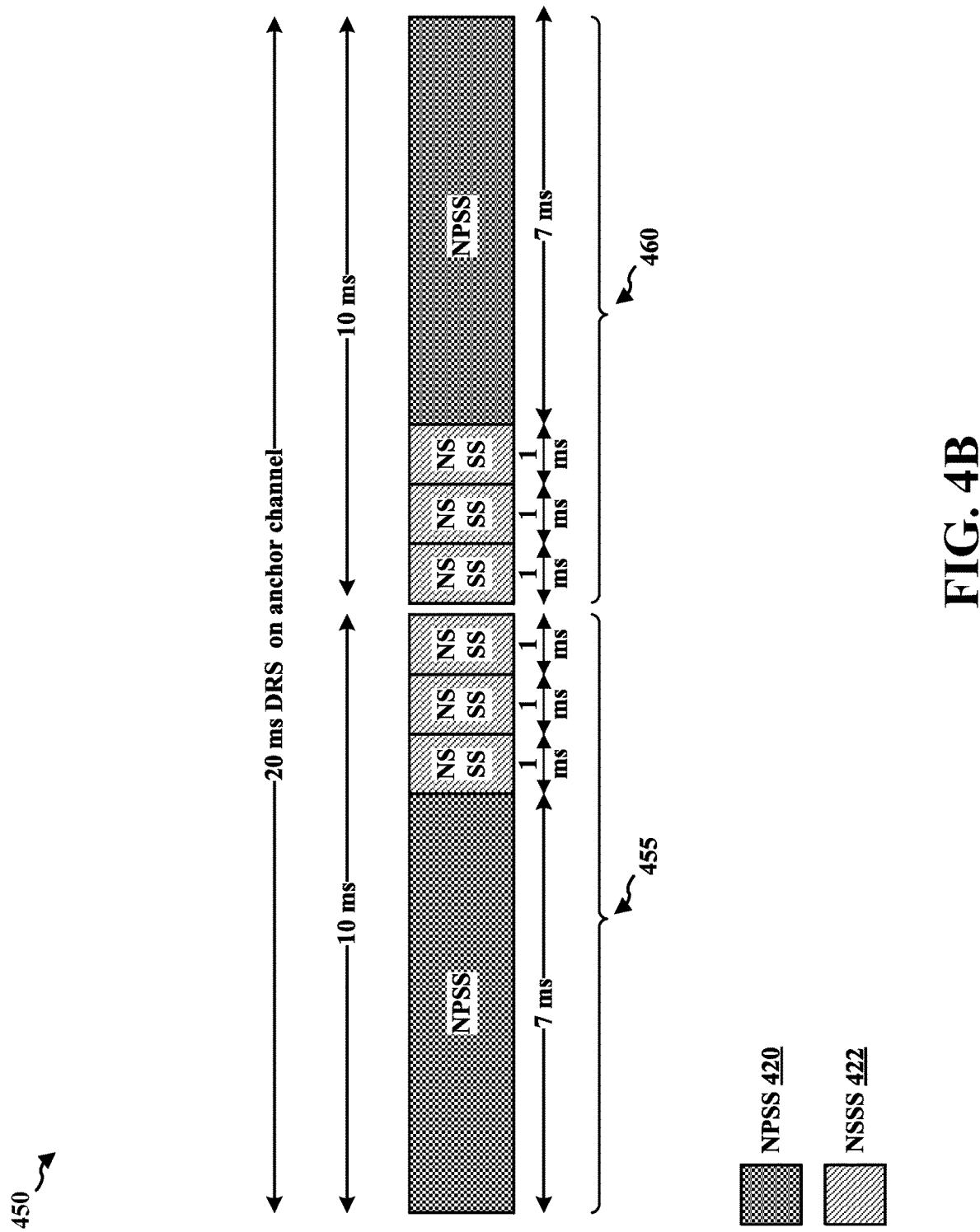
FIG. 4B illustrates an example 20 ms DRS on an anchor channel for operation under FCC regulations including two 10 ms bursts of NPSS/NSSS subframes that may be used to transmit narrowband synchronization signals between a base station and a UE in accordance with certain aspects of the disclosure.

FIG. 4B illustrates an example 20 ms DRS 450 on an anchor channel for operation under the second set of regulations showing two 10 ms bursts of NPSS/NSSS subframes that may be used to transmit narrowband synchronization signals between a base station and a UE in accordance with certain aspects of the disclosure. There are several differences in regulations and performance requirements between different countries, e.g., between the US and Europe. For example, in the US, to achieve the target maximum path loss of 161 dB with a maximum EIRP of 36 dBm under FCC regulations, the operating SNR for the three-RB anchor channel may be −13.27 dB per RB. The difference in SNR of 4.77 dB per RB between US and EU may be due to the spread of the DRS over 3 RBs in the US in contrast to one RB in EU. As such, receiver sensitivity for the detection of DRS in the US may be 4.77 dB better than that in the EU. However, in the US, there is no restriction on the duty cycle of NPSS/NSSS subframes with respect to the dwell period for a frequency hop. In contrast, in the EU, the duty cycle of NPSS/NSSS subframes may be restricted to 10% of the dwell period. As such, there is more flexibility in the design of the signal structure for the NPSS/NSSS subframes and the DRS in the US. For example, it may be desirable to increase the number of NPSS/NSSS subframes in the DRS compared to that for the EU. It may also be desirable to reduce the dwell period containing the anchor channel and the non-anchor channel per frequency hop from the 320 ms in the EU to 160 ms in the US.

As shown in FIG. 4B, an example 20 ms DRS 450 on an anchor channel for the second set of regulations may have a 10 ms burst of NPSS/NSSS subframes 455 at the beginning of the DRS 450. In particular, the DRS may start with 7 contiguous NPSS subframes 420 followed by 3 contiguous NSSS subframes 422, as in the DRS that meets the requirements described in connection with FIG. 4A. Although the following description describes the concept using the example of a 10 ms NPSS/NSSS block of subframes including 7 contiguous NPSS subframes followed by 3 contiguous NSSS subframes, it should be appreciated that the example quantity of subframes are for illustrative purposes and that the techniques disclosed herein may additionally or alternatively apply to different quantities of subframes. For example, the DRS may include a 10 ms NPSS/NSSS block of subframes including a first set of NPSS subframes (e.g., 8 contiguous NPSS subframes, etc.) and a second set of NSSS subframes (e.g., 2 contiguous NSSS subframes, etc.).

In FIG. 4B, following the first 10 ms burst of NPSS/NSSS subframes 455 is a second 10 ms burst of NPSS/NSSS subframes 460. In the second burst of NPSS/NSSS subframes 460, the locations of NPSS subframes and NSSS subframes may be reversed from those of the first 10 ms burst of NPSS/NSSS subframes 455. For example, the second burst of NPSS/NSSS subframes 460 includes 3 contiguous NSSS subframes 422 followed by 7 contiguous NPSS subframes 420. There are a total of 20 NPSS/NSSS subframes in the 20 ms DRS 450 of FIG. 4B. Keeping the first burst of the NPSS/NSSS subframes 455 the same as in the DRS under the first set of regulations (e.g., a first set of NPSS subframes, such as 8 contiguous NPSS subframes or 7 contiguous NPSS subframes (as shown in the example DRS of FIG. 4A) followed by a second set of NSSS subframes, such as 2 contiguous NSSS subframes or 3 contiguous NSSS subframes (as shown in the example DRS 415 of FIG. 4A) advantageously allows a single UE design to operate in both markets. A UE under the first set of regulations, e.g., in Europe, that successfully acquires the first burst of NPSS/NSSS subframes 455 does not need to acquire the second burst of NPSS/NSSS subframes 460, thereby conserving power. In addition, swapping the locations of the NPSS/NSSS subframes in the second burst of NPSS/NSSS subframes 460 from the those of the first burst of NPSS/NSSS subframes 455 builds in a safe guard so that a UE that acquires the NPSS subframes of the second burst 460 may not be able to detect the 3 NSSS subframes, thereby preventing the UE from false acquisition of the DRS.

The 4.77 dB improvement in performance for a UE under the second set of regulations compared to the first set of regulations, e.g., in US compared to Europe, may be achieved by a combination of decreasing the dwell period containing the anchor channel and the non-anchor channel per frequency hop by half (e.g., from the 320 ms in EU to 160 ms) and doubling the number of NPSS/NSSS subframes (e.g., from the 10 ms NPSS/NSSS subframes in EU to 20 ms that includes the first 10 ms burst of NPSS/NSSS subframes 455 followed by the second bust of swapped NPSS/NSSS subframes 460). The common 10 ms NPSS/NSSS subframes at the start of the DRS allow UEs operating under the first set of regulations and UE operating under the second set of regulations to share the same design. In one aspect, the base station may indicate an NB-IoT DRS or frame structure by reusing the unused 4 cyclic shifts in the NSSS subframe. However, it should be appreciated that additional or alternative quantities of unused cyclic shifts may be used. For example, in some examples, a first quantity (e.g., "x") of unused cyclic shifts may be used under a first set of regulations (e.g., under FCC regulations), while a second quantity (e.g., "y") of unused cyclic shifts may be used under a second set of regulations (e.g., under EU regulations). It should be appreciated that in some examples, the first quantity of unused cyclic shifts may be the same as the second quantity of unused cyclic shifts, while in other examples, the first quantity of unused cyclic shifts may be different than the second quantity of unused cyclic shifts. In one aspect, a UE operating in favorable operating conditions may be able to successfully acquire the NPSS/NSSS subframes using the first 10 ms of the DRS, thereby conserving power and reducing complexity by not being required to acquire the second 10 ms burst of the NPSS/NSSS subframes. As discussed above, the swapped NPSS/NSSS locations in the second 10 ms burst of the NPSS/NSSS subframes may prevent a UE from mistaking the second burst as the first burst, thus decreasing the probability of false acquisition. In one aspect, a UE may search for the first 10 ms burst of the NPSS/NSSS subframes initially and may switch to searching for the second burst of the NPSS/NSSS subframes if the UE is not able to acquire the NPSS/NSSS subframes using the first burst alone.

To increase the probability of successful acquisition and to decrease the probability of false acquisition, it may be desirable to increase the length of the cover code applied to the NPSS subframes. For example, using a length 14 cover code for the 14 OFDM symbols in an NPSS subframe may result in interference between subframes due to the seven back-to-back repetitions of the NPSS subframes. Thus, it may be desirable to increase the length of the cover code for the NPSS subframes to cover all the OFDM symbols for the 14 NPSS subframes of the DRS subframe operating under the second set of regulations.

Figure 5:
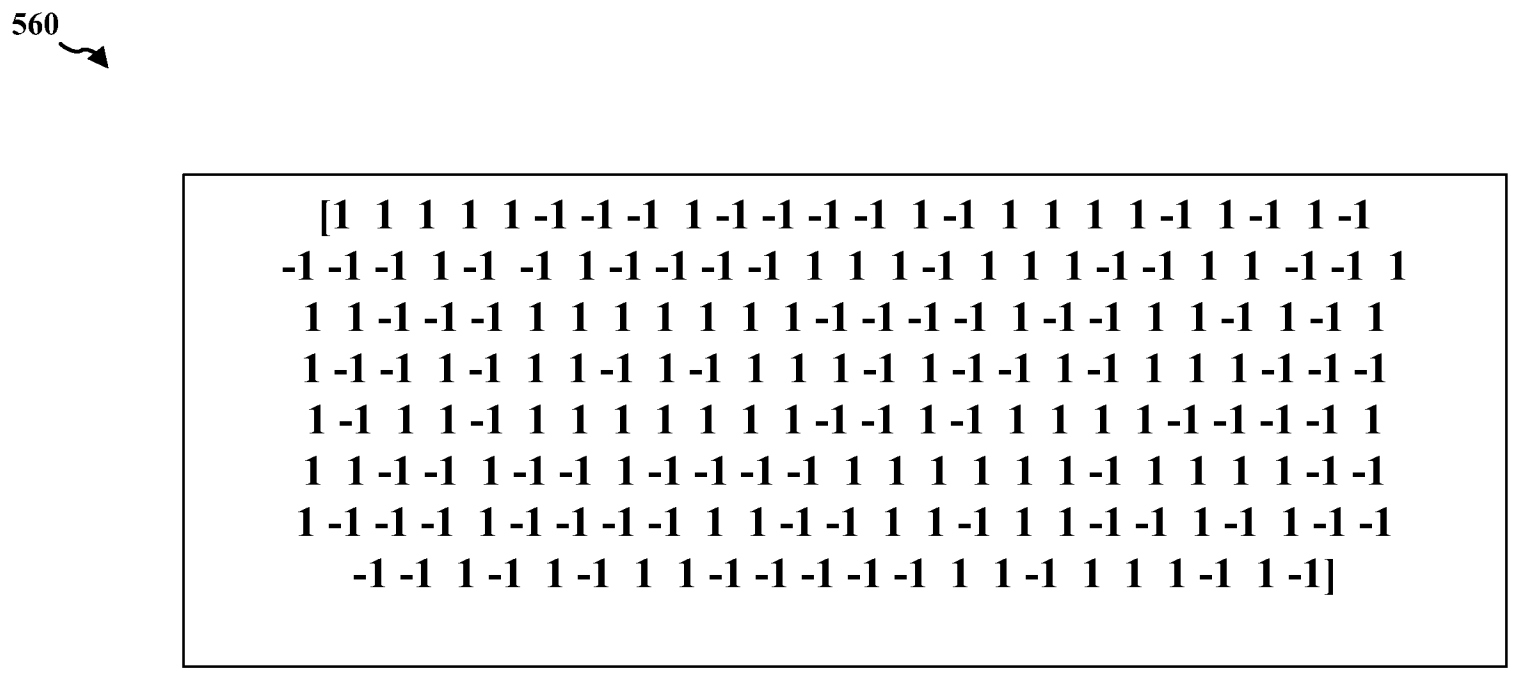

FIG. 5 shows an example cover code 560 that may be applied to the OFDM symbols of the NPSS subframes to aid a UE in acquiring the DRS on the anchor channel in accordance with certain aspects of the disclosure. The cover code 560 has a length of 196, or one code for each of the 14 OFDM symbols in each of the 14 NPSS subframes of the DRS operating under the second set of regulations. In one aspect, the first half of the cover code may be applied to all the symbols in the 7 NPSS subframes of a DRS design in FIG. 4A, e.g., which may be applied under the first set of regulations. It should be appreciated that the example cover code 560 of FIG. 5 is for illustrative purposes and that the length of the cover code and/or structure of the cover code may be modified as appropriate. For example, while the example cover code 560 of FIG. 5 is of length 196 (e.g., one code for each of the 14 OFDM symbols in each of 14 NPSS subframes of the DRS operating under the first set of regulations), in additional or alternative examples, the cover code may have a length corresponding to the quantity of NPSS subframes of the DRS operating under the second set of regulations. For example, the cover code may have a length of 112 (e.g., one code for each of the 14 OFDM symbols in each of 8 NPSS subframes of the DRS), a length of 98 (e.g., one code for each of the 14 OFDM symbols in each of 7 NPSS subframes of the DRS as shown in the DRS 415 of FIG. 4A), etc.

Figure 6A:
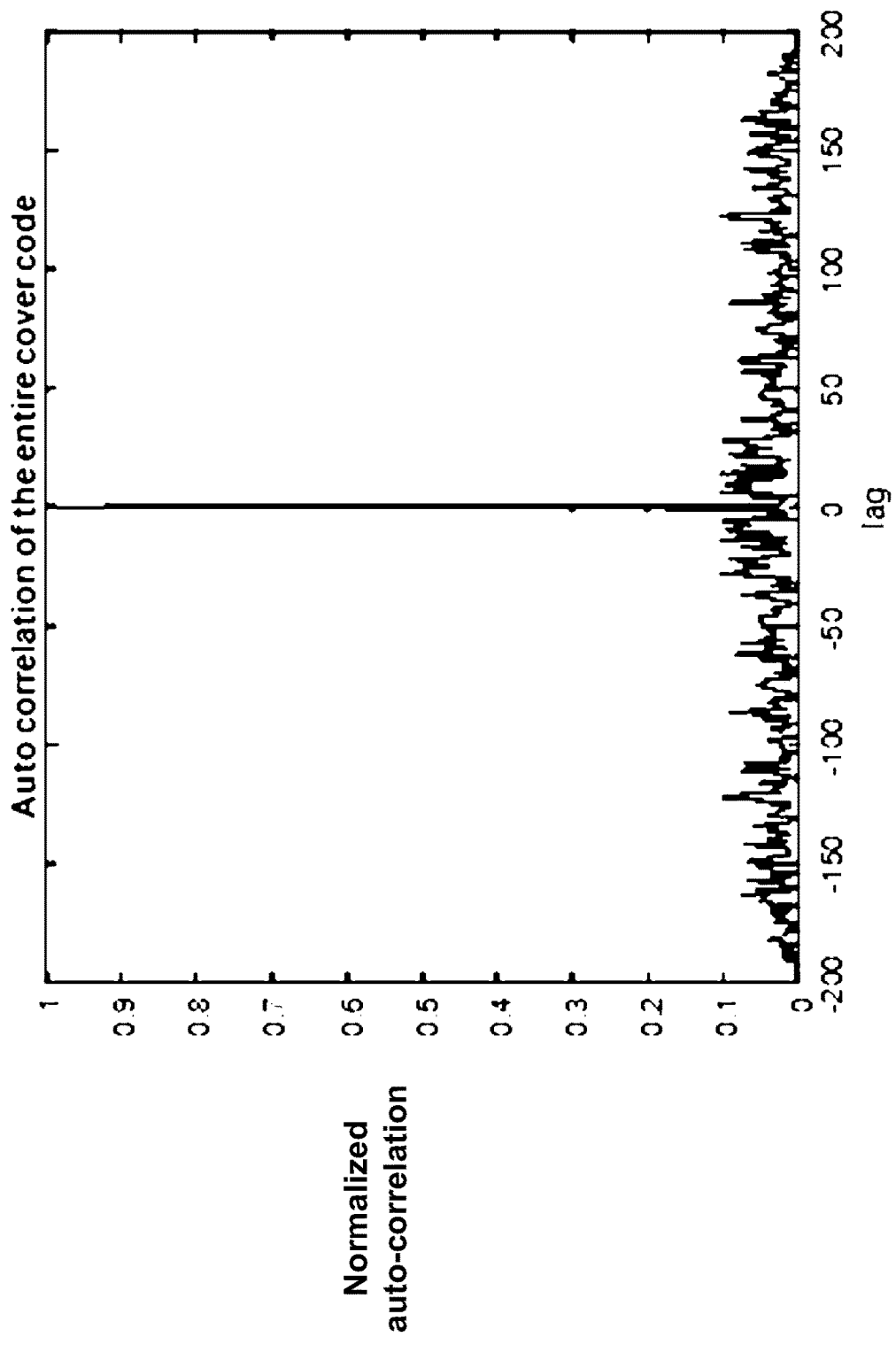
FIG. 6A shows the auto correlation of the cover code of FIG. 5 that may be applied to the OFDM symbols of the NPSS subframes in accordance with certain aspects of the disclosure.

FIG. 6A shows auto correlation 660 of the cover code 560 of FIG. 5 that may be applied to the OFDM symbols of the NPSS subframes in accordance with certain aspects of the disclosure. FIG. 6A shows that the cover code 560 has a strong auto correlation peak, thus increasing the probability of successful acquisition and decreasing the probability of false acquisition when the timing hypothesis of the NPSS subframes on the UE is misaligned with the received NPSS subframes.

Figure 6B:
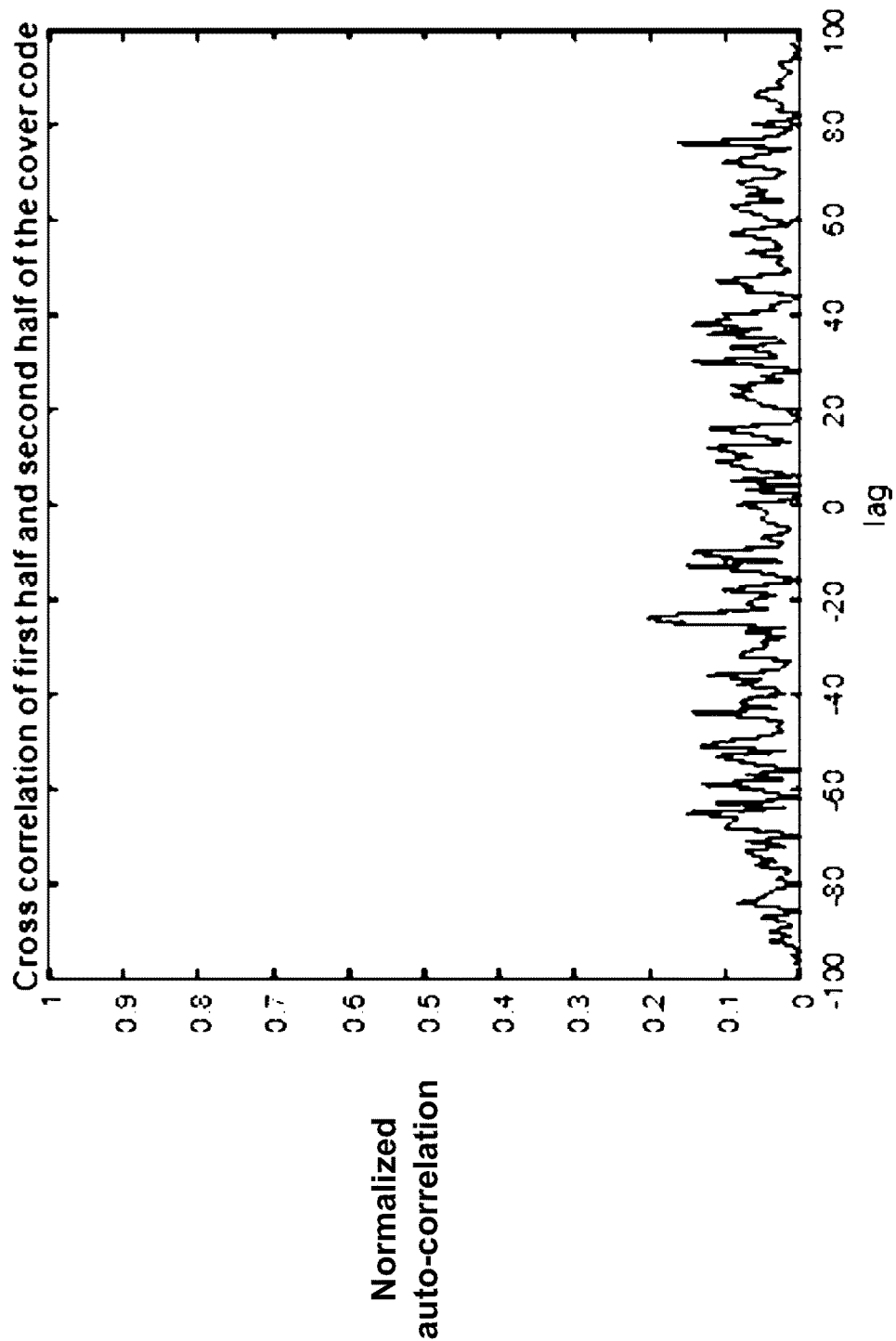
FIG. 6B shows the cross correlation of the first half and the second half of the cover code of FIG. 5 that may be applied to the OFDM symbols of the NPSS subframes in accordance with certain aspects of the disclosure.

FIG. 6B shows cross correlation 670 of the first half and the second half of the cover code 560 of FIG. 5 that may be applied to the OFDM symbols of the NPSS subframes in accordance with certain aspects of the disclosure. FIG. 6B shows that the first half and the second half of the cover code have low cross-correlation. Thus, under the second set of regulations, even when the UE searches through the first 10 ms NPSS/NSSS burst of subframes (e.g., the first burst of NPSS/NSSS subframes 455 of FIG. 4B), the probability of mistaking the first 10 ms NPSS/NSSS burst for the second 10 ms NPSS/NSSS burst of subframes (e.g., the second burst of NPSS/NSSS subframes 460 of FIG. 4C) is low. Even if the UE mistakes the second 10 ms NPSS/NSSS burst of subframes for the first 10 ms NPSS/NSSS burst of subframes, the swapped NPSS/NSSS locations between the first burst and the second burst may prevent UE from false acquisition of the DRS.

Figure 7:
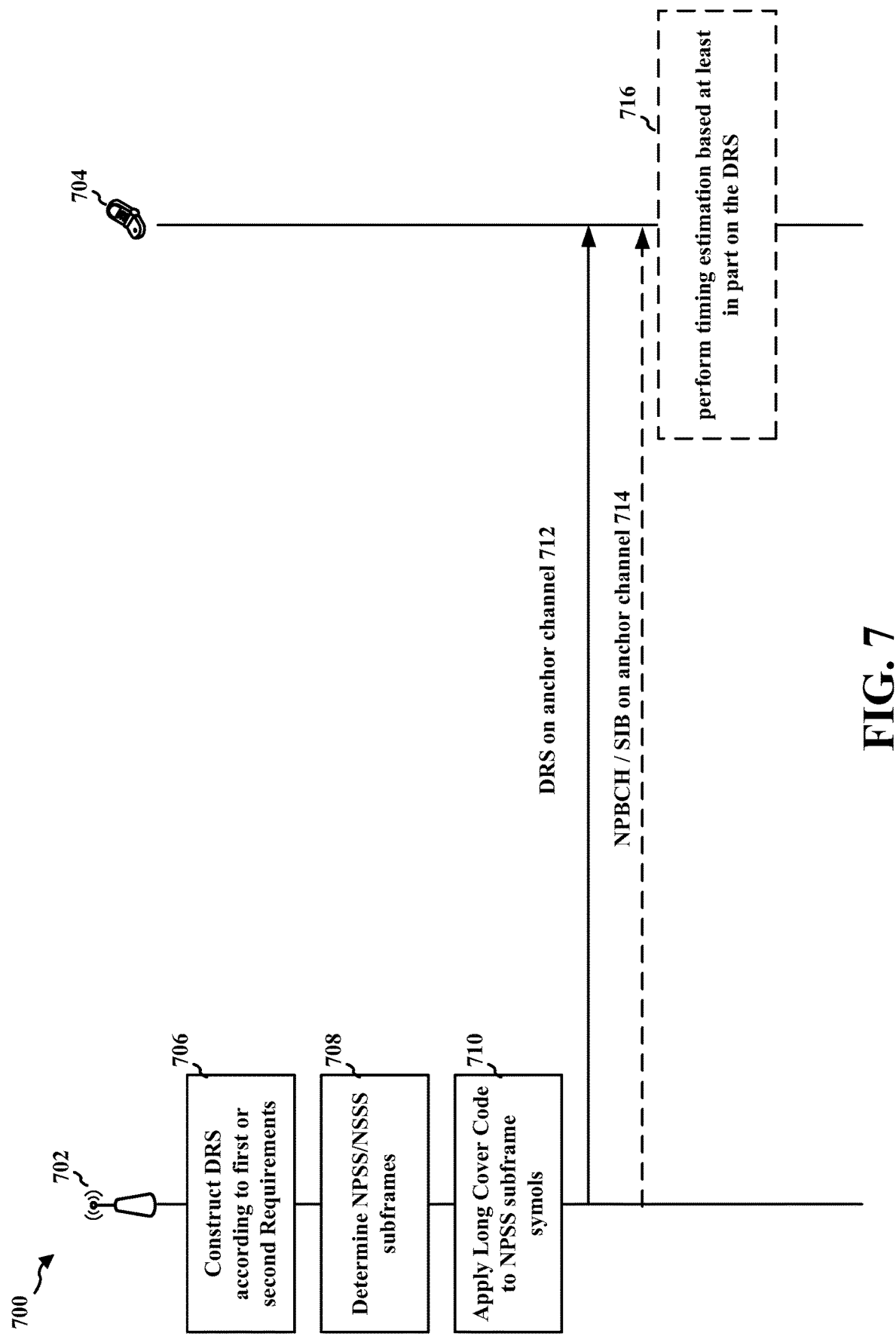
FIG. 7 illustrates a data flow that may be used to construct and transmit the DRS on an anchor channel operating under either FCC or EU regulations in accordance with certain aspects of the disclosure.

FIG. 7 illustrates a data flow 700 between a base station 702 (e.g., the base station 102, 180 of FIG. 1, the base station 310 of FIG. 3, the DRS component 198 of FIGS. 1 and/or 3, and/or apparatus 902/902' of FIG. 9/10, respectively) and a UE 704 (e.g., the UE 104 of FIG. 1, the UE 350 of FIG. 3, and/or the UE 950 of FIG. 9) that may be used to construct and transmit the DRS on an anchor channel operating under either a first set of regulations or a second set of regulations, e.g., either under FCC or EU regulations, in accordance with certain aspects of the disclosure. In addition, the base station 702 and the UE 704 may be configured to communicate using a frequency hopping pattern in the unlicensed frequency spectrum. For example, the base station 702 and the UE 704 may be NB-IoT devices. In FIG. 7, optional operations are indicated with dashed lines.

In certain configurations, the base station 702 may determine at 706 whether it is operating under FCC regulations (in the US) or under EU regulations. In one aspect, the base station 702 may construct a DRS for the first set of regulations or the second set of regulations based on the determined regulations. In some examples, the base station 702 may determine whether it is operating under first set of regulations or under the second set of regulations based on location information of the base station 702, such as derived from a GPS receiver and/or from location information provided by other systems. The base station 702 may use the location information to determine whether the base station 702 is operating in a particular country, e.g., in the US or in the EU, and then to determine the appropriate regulations. However, it should be appreciated that in some examples, the base station may additionally or alternatively be programmed (or hard-coded) with the appropriate location information and/or information identifying the appropriate regulations.

At 708, the base station 702 may determine the NPSS/NSSS subframes based on whether it is operating under the first set of regulations or the second set of regulations. For example, if operating under the first set of regulations, e.g., in the EU, the base station 702 may construct a 32 ms DRS on an anchor channel in which 10 ms of NPSS/NSSS subframes are transmitted at the beginning of the DRS. In particular, the DRS may start with a first set of contiguous NPSS subframes (e.g., the 7 contiguous NPSS subframes 420, as shown in the DRS 415 of FIG. 4A) followed by a second set of contiguous NSSS subframes (e.g., the 3 contiguous NSSS subframes 422, as shown in the DRS of FIG. 4A). The 10 ms NPSS/NSSS block of subframes may be followed by 22 ms of NPBCH subframes or reduced SIB data 424 that constitutes the rest of the 32 ms DRS subframes. In some examples, the DRS may be followed by non-anchor channels or data channels that are frequency hopped to carry DL data or UL data.

On the other hand, if operating under the second set of regulations, e.g. in the US, the base station 702 may construct a 20 ms DRS on an anchor channel that has a 10 ms burst of NPSS/NSSS subframes at the beginning of the DRS (e.g., the example first burst of NPSS/NSSS subframes 455 of FIG. 4B). In particular, the DRS may start with a first set of contiguous NPSS subframes (e.g., the 7 contiguous NPSS subframes 420 of the first burst of NPSS/NSSS subframes 455, as shown in the DRS 450 of FIG. 4B) followed by a second set of contiguous NSSS subframes (e.g., the 3 contiguous NSSS subframes 422 of the first burst of NPSS/NSSS subframes 455, as shown in the DRS 450 of FIG. 4B). Following the first 10 ms burst of NPSS/NSSS subframes may be a second 10 ms burst of NPSS/NSSS subframes (e.g., the second burst of NPSS/NSSS subframes 460 of FIG. 4B). In some examples, the locations of the NPSS subframes and the NSSS subframes of the second burst of NPSS/NSSS subframes may be swapped with respect to the first burst of NPSS/NSSS subframes, as shown in FIG. 4B. For example, the second burst of NPSS/NSSS subframes may include a third set of contiguous NSSS subframes (e.g., the 3 contiguous NSSS subframes 422 of the second burst of NPSS/NSSS subframes 460, as shown in the DRS 450 of FIG. 4B) followed by a fourth set of contiguous NPSS subframes (e.g., the 7 contiguous NPSS subframes 420 of the second burst of NPSS/NSSS subframes 460, as shown in the DRS 450 of FIG. 4B). In some examples, there may be a total of 20 NPSS/NSSS subframes in the 20 ms DRS.

At 710, the base station 702 may apply a long cover code to the symbols of the NPSS subframes. For example, the base station 702 may apply the cover code 560 of FIG. 5 to all of the OFDM symbols of the NPSS subframes to aid a UE in acquiring the DRS on the anchor channel. The cover code 560 may have a length of 196, or one code for each OFDM symbols in each of the NPSS subframes of the DRS, as shown in the example cover code 560 of FIG. 5. In one aspect, the first half of the cover code may be applied to all the symbols in the first set of NPSS subframes of the DRS. In some examples, the length of the cover code may correspond to the quantity of NPSS subframes of the DRS. For example, the length of the cover code may be based on the quantity of NPSS subframes (e.g., 8 NPSS subframes, etc.) and the quantity of OFDM symbols for each of the NPSS subframes (e.g., 14 OFDM symbols per NPSS subframe, etc.).

At 712, the base station 702 may transmit the DRS on an anchor channel. In one aspect, at 714, the base station 702 may transmit the NPBCH or the reduced SIB on the rest of the DRS. For example, based on the example 32 ms DRS 415 of FIG. 4A, the base station 702 may transmit the NPBCH or the reduced SIB in the 22 ms portion of the DRS following the 10 ms NPSS/NSSS subframes. At 716, a UE may perform timing estimation and/or frequency estimation by acquiring the NPSS/NSSS subframes of the DRS on the anchor channel. It should be appreciated that in some examples, the UE may buffer for a duration based on the quantity of NPSS subframes before performing, for example, the timing estimation and/or frequency estimation.

Figure 8:
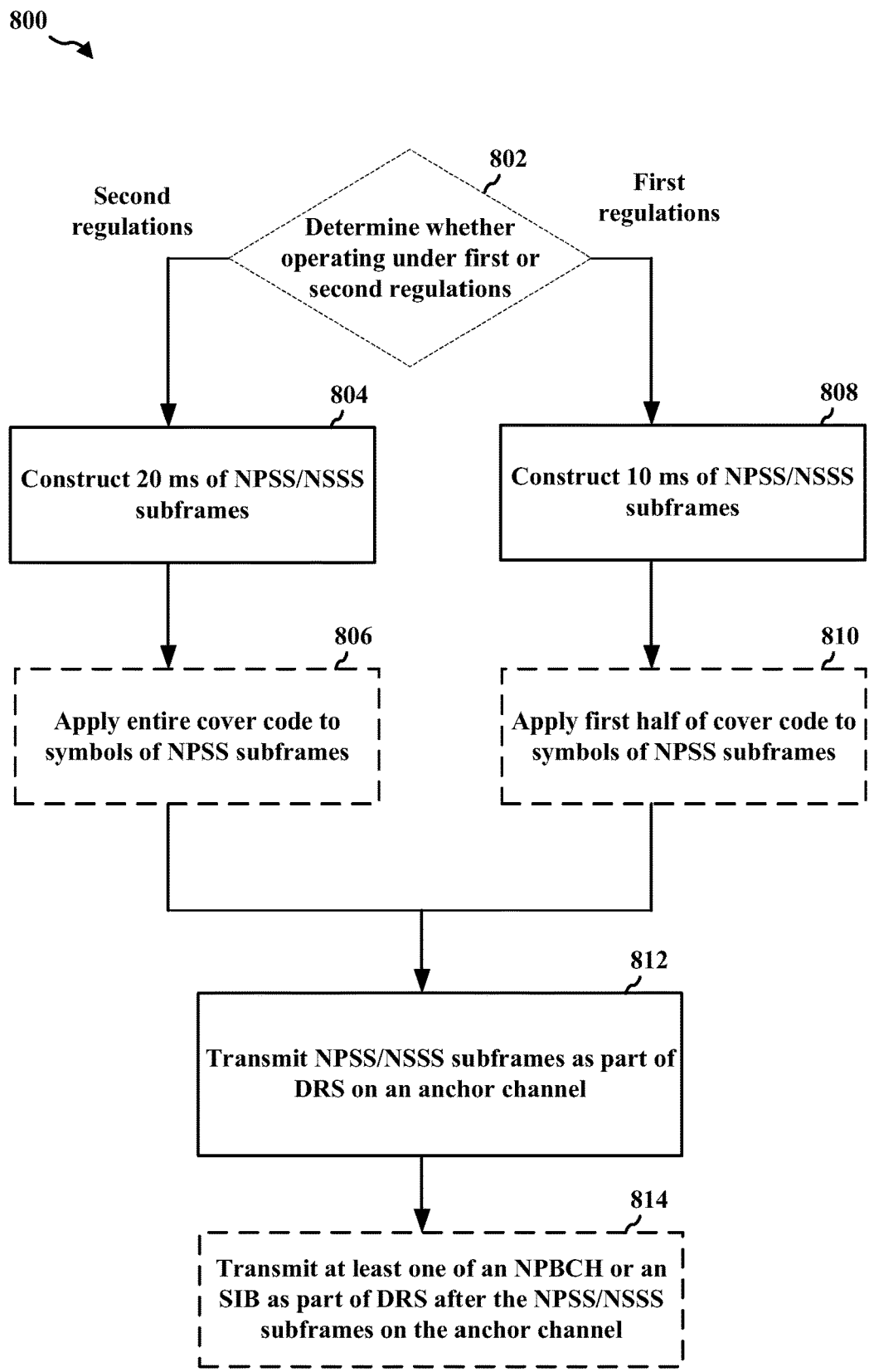
FIG. 8 is a flowchart of a method of constructing and transmitting the DRS on an anchor channel operating under either FCC or EU regulations in accordance with certain aspects of the disclosure.

FIG. 8 is a flowchart 800 of a method of a base station constructing and transmitting the DRS on an anchor channel, in accordance with certain aspects of the disclosure. The method may be performed by a base station (e.g., base station 102, 180, 310, 702, 902/902'; the processing system 1014, which may include memory 376 and which may be the entire base station 310 or a component of the base station 310, such as the TX processor 316, the RX processor 370, and/or the controller/processor 375, and/or the DRS component 198 of FIGS. 1 and/or 3). In FIG. 8, optional operations are indicated with dashed lines. Furthermore, while the example flowchart 800 of FIG. 8 includes determining regulations under which the base station is operating and constructing a DRS based on the respective regulations, it should be appreciated that either DRS may be constructed for operating under either regulation, and/or for operating under additional or alternative regulations. For example, a common DRS may be constructed for a base station operating under any regulations. The method may improve detection of DRS.

At 802, the base station may determine whether it is operating under a first set of regulations or a second set of regulations. As one example, the base station may determine whether it is operating under FCC regulations or operating under EU regulations. For example the determination may be performed by determination component 906, as described in connection with FIG. 9. In one aspect, the base station may make the determination based on its location, such as derived from a GPS receiver and/or from location information provided by other systems. The base station may use the location information to determine whether the base station is operating in a particular country, e.g., in the US or in the EU.

At 804, under the second set of regulations, the base station may construct a 20 ms DRS on an anchor channel that has a first 10 ms burst of NPSS/NSSS subframes at the beginning of the DRS, as shown in connection with the DRS 450 of FIG. 4B. The construction may be performed by NPSS component 910 and NSSS component 912, as described in connection with FIG. 9. In one aspect, the DRS starts with a first set of contiguous NPSS subframes (e.g., the example 7 contiguous NPSS subframes 420 of the first 10 ms burst of NPSS/NSSS subframes 455 of FIG. 4B) followed by a second set of contiguous NSSS subframes (e.g., the example 3 contiguous NSSS subframes 422 of the first 10 ms burst of NPSS/NSSS subframes 455). In some examples, the first 10 ms burst of NPSS/NSSS subframes may be followed by a second 10 ms burst of NPSS/NSSS subframes (e.g., the second 10 ms burst of NPSS/NSSS subframes 460 of FIG. 4B). In the second burst of NPSS/NSSS subframes, the locations of the NPSS subframes and the NSSS subframes may be swapped with respect to their respective locations in the first burst of NPSS/NSSS subframes, as shown in FIG. 4B. For example, in the example DRS 450 of FIG. 4B, the second burst of NPSS/NSSS subframes 460 may include 3 contiguous NSSS subframes 422 followed by 7 contiguous NPSS subframes 420, while the first burst of NPSS/NSSS subframes 455 includes 7 contiguous NPSS subframes 420 followed by 3 contiguous NSSS subframes 422. As shown in the example DRS 450 of FIG. 4B, there may be a total of 20 NPSS/NSSS subframes in the 20 ms DRS.

At 806, the base station may apply a long cover code to the symbols of the NPSS subframes. The application of the cover code may be performed by cover code component 908, as described in connection with FIG. 9. For example, the base station may apply the cover code 560 of FIG. 5 to all of the OFDM symbols of the NPSS subframes to aid a UE in acquiring the DRS on the anchor channel. The cover code may have a length based on the quantity of NPSS subframes of the DRS and the quantity of OFDM symbols in each of the NPSS subframes. For example, the cover code 560 of FIG. 5 is of length 196, or one code for each of the 14 OFDM symbols in each of the 14 NPSS subframes of the DRS 450 of FIG. 4B.

If the base station determines that it is operating under the first set of regulations, e.g., in the EU, then, at 808, the base station may construct a 32 ms DRS on an anchor channel in which 10 ms of NPSS/NSSS subframes are transmitted at the beginning of the DRS, as shown in connection with the example DRS 415 of FIG. 4A. The construction may be performed by NPSS component 910 and NSSS component 912, as described in connection with FIG. 9. In one aspect, the DRS may start with a first set of contiguous NPSS subframes (e.g., the 7 contiguous NPSS subframes 420 of FIG. 4A) followed by a second set of contiguous NSSS subframes (e.g., the 3 contiguous NPSS subframes 422, as shown in FIG. 4A). The 10 ms NPSS/NSSS may then be followed by 22 ms of NPBCH or reduced SIB data 424 that are comprised in the remaining subframes of the 32 ms DRS. In some examples, the DRS may be followed by non-anchor channels or data channels that are frequency hopped to carry DL data or UL data.

At 810, the base station may apply a long cover code to the symbols of the NPSS subframes. The application of the cover code may be performed by cover code component 908, as described in connection with FIG. 9. For example, the base station may apply the cover code 560 of FIG. 5 to OFDM symbols of the NPSS subframes to aid a UE in acquiring the DRS on the anchor channel. While the example cover code 560 of FIG. 5 has a length of 196, it should be appreciated that the length of the cover code may vary based on, for example, the quantity of NPSS subframes in the DRS and the quantity of OFDM symbols in each of the NPSS subframes. In some examples, the base station may apply the first half of the cover code to all the symbols in the NPSS subframes of the DRS. For example, the length of the cover code may be based on the DRS 450 of FIG. 4B in which two bursts of NPSS/NSSS subframes are constructed. In certain such examples, the quantity of NPSS subframes (e.g., 14 NPSS subframes in the example DRS 450 of FIG. 4B) is twice the quantity of NPSS subframes included in the DRS in which one burst of NPSS/NSSS subframes is constructed (e.g., 7 NPSS subframes in the DRS 415 of FIG. 4A). Accordingly, when the base station constructs the DRS including one burst of NPSS/NSSS subframes, the base station may apply the first half of (or a portion of) the cover code, as the length of the cover code may depend on the quantity of NPSS subframes of the DPS. However, it should be appreciated that the length of the cover code may additionally or alternatively be based on the DRS 415 of FIG. 4A in which one burst of NPSS/NSSS subframes are constructed. In certain such examples, the base station may apply the full cover code, rather than a portion of the cover code.

At 812, the base station transmits the DRS on an anchor channel. For example, the transmission may be performed by transmission component 920, described in connection with FIG. 9, e.g., in connection with NPSSS component 910 and NSSS component 912. At 814, the base station may transmit the NPBCH or the reduced SIB on the rest of the DRS. The transmission may be performed by transmission component 920, described in connection with FIG. 9, e.g., in connection with NPBCH component 914 or SIB component 916. For example, in the example 32 ms DRS 415 of FIG. 4A, the base station may transmit the NPBCH or the reduced SIB in the 22 ms portion of the DRS following the 10 ms NPSS/NSSS subframes.

Figure 9:
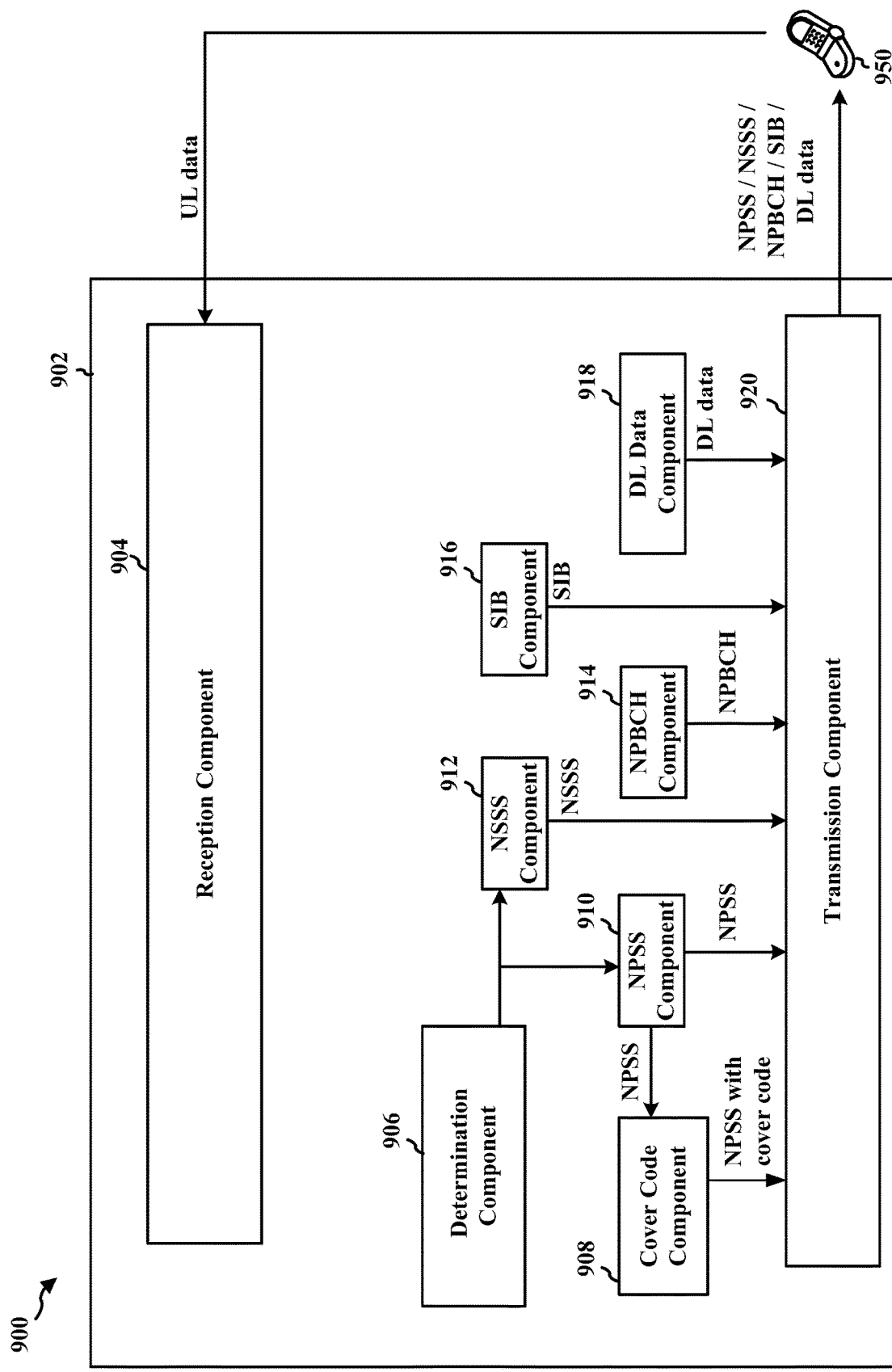
FIG. 9 is a conceptual data flow diagram illustrating the data flow between different means/components in an example apparatus that constructs and transmits the DRS on an anchor channel operating under either FCC or EU regulations in accordance with certain aspects of the disclosure.

FIG. 9 is a conceptual data flow diagram 900 illustrating the data flow between different means/components in an example apparatus that constructs and transmits the DRS on an anchor channel operating under either FCC or EU regulations in accordance with certain aspects of the disclosure. The apparatus may be a base station (e.g., the base station 102, 180, of FIG. 1, the base station 310 of FIG. 3, the base station 702 of FIG. 7, and/or the apparatus 902' of FIG. 10) in communication with a UE 950 (e.g., the UE 104 of FIG. 1, the UE 350 of FIG. 3, and/or the UE 704 of FIG. 7). The apparatus may include a reception component 904, an determination component 906, a cover code component 908, an NPSS component 910, an NSSS component 912, an NPBCH component 914, an SIB component 916, a DL data component 918, and a transmission component 920.

In certain configurations, the determination component 906 may be configured to determine whether the apparatus is operating under a first set of regulations or a second set of regulations, e.g., whether the apparatus is operating under EU regulations. In one aspect, the apparatus may determine the appropriate regulations from its location, which may be derived from a GPS receiver or from location information provided by other systems. The apparatus may use the location information to determine a country, a region, etc., e.g., whether the apparatus is operating in the US or in the EU.

In certain configurations, the cover code component 908 may be configured to apply a long cover code to the symbols of the NPSS subframes. For example, the apparatus may apply the cover code 560 of FIG. 5 to OFDM symbols of the NPSS subframes to aid a UE in acquiring the DRS on the anchor channel. The cover code 560 may have a length based on the quantity of NPSS subframes of the DRS and the quantity of OFDM symbols for each NPSS subframe. In some examples, the cover code component 908 may apply a portion of (e.g., the first half of) the cover code to all of the symbols in the NPSS subframes of the DRS, such as when the cover code is based on two bursts of NPSS/NSSS subframes and the DRS includes one burst of NPSS/NSSS subframes.

In certain configurations (e.g., when the apparatus is operating under US regulations), the NPSS component 910 and the NSSS component 912 may be configured to construct a 20 ms DRS on an anchor channel that starts with a first set of contiguous NPSS subframes (e.g., 7 contiguous NPSS subframes 420, as shown in FIG. 4B) followed by a second set of contiguous NSSS subframes (e.g., 3 contiguous NSSS subframes 422, as shown in FIG. 4B). In certain such examples, the first 10 ms burst of NPSS/NSSS subframes may be followed by a second 10 ms burst of NPSS/NSSS subframes. In the second burst of NPSS/NSSS subframes, the locations of the NPSS subframes and the NSSS subframes may be swapped from their respective locations in the first burst, as shown in FIG. 4B. For example, the second burst of NPSS/NSSS subframes 460 of FIG. 4B includes 3 contiguous NSSS subframes 422 followed by 7 contiguous NPSS subframes 420. As shown in the example DRS 450 of FIG. 4B, there are a total of 20 NPSS/NSSS subframes in the 20 ms DRS.

In some configurations (e.g., when the apparatus is operating under EU regulations), the NPSS component 910 and the NSSS component 912 may be configured to construct a 32 ms DRS on an anchor channel in which 10 ms of NPSS/NSSS subframes are transmitted at the beginning of the DRS. For example, the DRS may start with a first set of contiguous NPSS subframes (e.g., 7 contiguous NPSS subframes 420, as shown in FIG. 4A) followed by a second set of contiguous NSSS subframes (e.g., 3 contiguous NSSS subframes 422, as shown in FIG. 4A). The 10 ms NPSS/NSSS subframes may then be followed by 22 ms of NPBCH or reduced SIB data 424 that constitutes the remaining subframes of the 32 ms DRS. In some examples, the DRS may be followed by non-anchor channels and/or data channels that are frequency hopped to carry DL data or UL data.

In certain configurations, the NPBCH component 914 may be configured to generate one or more NPBCH transmissions. The NPBCH component 914 may be configured to send the one or more NPBCH transmissions to the transmission component 920. The DL data component 918 may be configured to generate one or more DL data transmissions. The DL data component 918 may be configured to send the one or more DL data transmissions to the transmission component 920. The SIB component 916 may be configured to generate the reduced SIB data. The SIB component 916 may be configured to send the reduced SIB data to the transmission component 920.

In certain configurations, the transmission component 920 may be configured to transmit the DRS on the anchor channel and data on non-anchor channel(s).

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
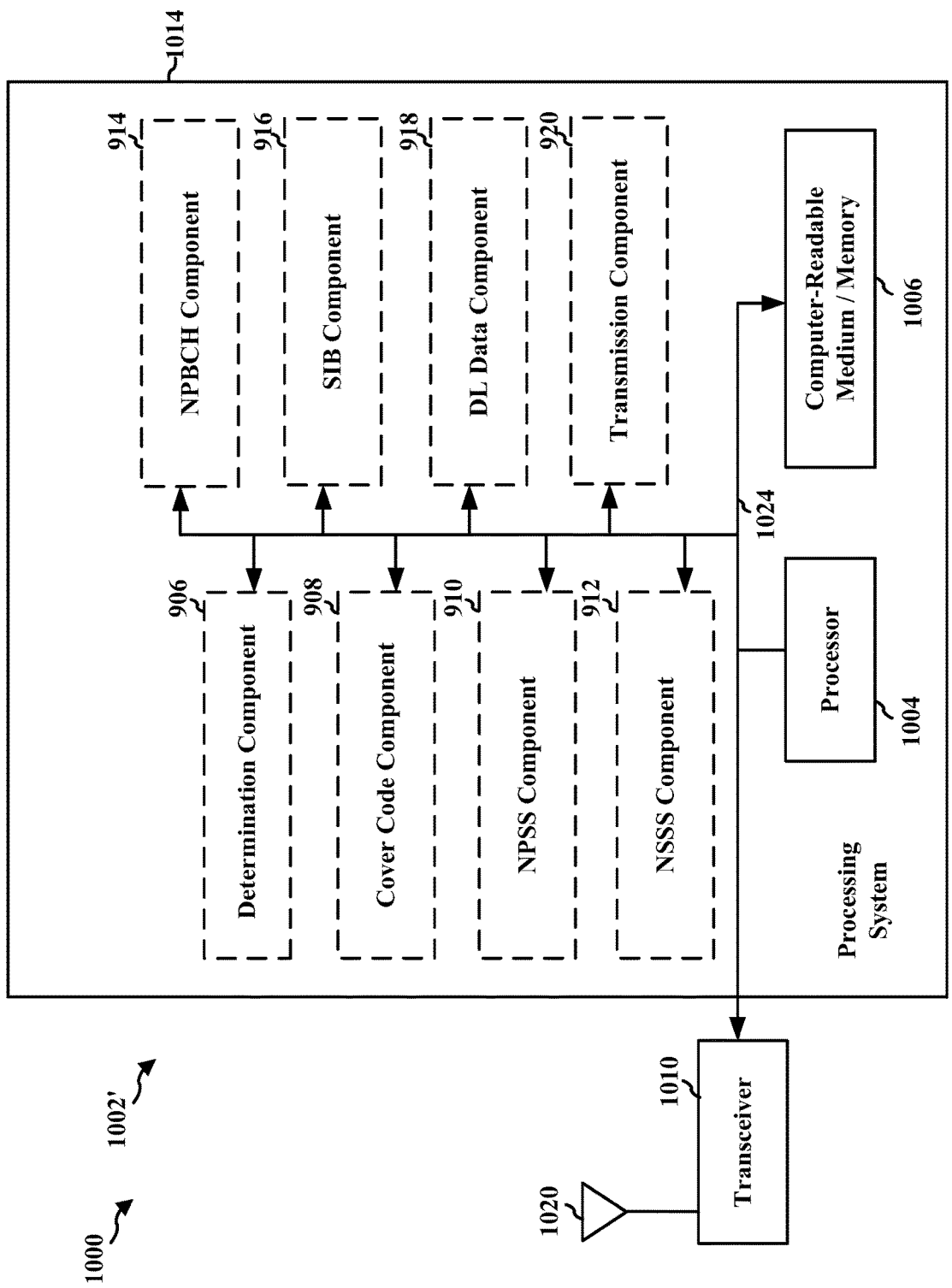
FIG. 10 is a diagram illustrating an example of a hardware implementation for an apparatus employing a processing system to construct and transmit the DRS on an anchor channel operating under either FCC or EU regulations in accordance with certain aspects of the disclosure.

FIG. 10 is a diagram illustrating an example of a hardware implementation for an apparatus 1000 employing a processing system 1014 to construct and transmit the DRS on an anchor channel (operating under either FCC regulations or EU regulations) in accordance with certain aspects of the disclosure. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 906, 908, 910, 912, 914, 916, 918, 920 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014. In addition, the transceiver 1010 receives information from the processing system 1014, specifically the transmission component 920, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 906, 908, 910, 912, 914, 916, 918, 920. The components may be software components running in the processor 1004, resident/stored in the computer readable medium/memory 1006, one or more hardware components coupled to the processor 1004, or some combination thereof. The processing system 1014 may be a component of the base station 310 and may include the memory 376 and/or at least one of the TX processor 316, the RX processor 370, and the controller/processor 375. Alternatively, the processing system 1014 may be the entire base station (e.g., see base station 310 of FIG. 3).

In certain configurations, the apparatus 1002/1002' for wireless communication may include means for determining a DRS for narrowband communications in the unlicensed frequency spectrum. In certain other configurations, the apparatus 1002/1002' for wireless communication may include means for determining whether the apparatus 1002/1002' is operating in FCC or EU. In certain aspects, apparatus 1002/1002' for wireless communication may include means for determining the cover code, means for constructing the NPSS, and means for constructing the NSSS of the DRS. The aforementioned means may be one or more of the aforementioned components of the apparatus 902 and/or the processing system 1014 of the apparatus 1002' configured to perform the functions recited by the aforementioned means. As described supra, the processing system 1014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of narrowband wireless communication for a base station, comprising:
   constructing a Discovery Reference Signal (DRS) comprising a first set of contiguous narrowband primary synchronization signal (NPSS) subframes followed by a second set of contiguous repeating narrowband secondary synchronization signal (NSSS) subframes, at least one of the first set of contiguous NPSS subframes or the second set of contiguous repeating NSSS subframes comprising a plurality of adjacent subframes; and
   transmitting the DRS on an anchor channel.

2. The method of claim 1, wherein the DRS comprises fourteen symbols within each of the NPSS subframes or the NSSS subframes.

3. The method of claim 1, wherein the DRS further comprises a swapped burst of the first set of contiguous NPSS subframes and the second set of contiguous repeating NSSS subframes, wherein the swapped burst comprises a third set of contiguous repeating NSSS subframes following the second set of contiguous repeating NSSS subframes and a fourth set of contiguous NPSS subframes following the third set of contiguous repeating NSSS subframes, and wherein respective quantities of subframes of the first set of contiguous NPSS subframes and the fourth set of contiguous NPSS subframes is the same and respective quantities of subframes of the second set of contiguous repeating NSSS subframes and the third set of contiguous repeating NSSS subframes is the same.

4. The method of claim 1, further comprising:
   indicating a frame structure of the DRS based on a cyclic shift in the NSSS subframes.

5. The method of claim 1, further comprising:
   applying a cover code to symbols of the NPSS subframes of the DRS.

6. The method of claim 5, wherein the cover code is not applied to the NSSS subframes of the DRS.

7. The method of claim 5, wherein the cover code has a length to cover at least a product of a quantity of the NPSS subframes and a quantity of symbols in each of the NPSS subframes.

8. The method of claim 5, wherein the applying of the cover code to the symbols of the NPSS subframes further comprising applying a portion of the cover code.

9. The method of claim 8, wherein the portion of the cover code is a first half of the cover code.

10. An apparatus for wireless communication at a base station, comprising:
- a memory; and
- at least one processor coupled to the memory and configured to cause the apparatus to:
  - construct a Discovery Reference Signal (DRS) comprising a first set of contiguous narrowband primary synchronization signal (NPSS) subframes followed by a second set of contiguous repeating narrowband secondary synchronization signal (NSSS) subframes, at least one of the first set of contiguous NPSS subframes or the second set of contiguous repeating NSSS subframes comprising a plurality of adjacent subframes; and
  - transmit the DRS on an anchor channel.

11. The apparatus of claim 10, wherein the DRS comprises fourteen symbols within each of the NPSS subframes or the NSSS subframes.

12. The apparatus of claim 10, wherein the DRS further comprises a swapped burst of the first set of contiguous NPSS subframes and the second set of contiguous repeating NSSS subframes, wherein the swapped burst comprises a third set of contiguous repeating NSSS subframes following the second set of contiguous repeating NSSS subframes and a fourth set of contiguous NPSS subframes following the third set of contiguous repeating NSSS subframes, and wherein respective quantities of subframes of the first set of contiguous NPSS subframes and the fourth set of contiguous NPSS subframes is the same and respective quantities of subframes of the second set of contiguous repeating NSSS subframes and the third set of contiguous repeating NSSS subframes is the same.

13. The apparatus of claim 10, wherein the at least one processor is further configured to: indicate a frame structure of the DRS based on a cyclic shift in the NSSS subframes.

14. The apparatus of claim 10, wherein the at least one processor is further configured to: apply a cover code to symbols of the NPSS subframes of the DRS.

15. The apparatus of claim 14, wherein the cover code is not applied to the NSSS subframes of the DRS.

16. The apparatus of claim 14, wherein the cover code has a length to cover at least a product of a quantity of the NPSS subframes and a quantity of symbols in each of the NPSS subframes.

17. The apparatus of claim 14, wherein the at least one processor is further configured to apply the cover code to the symbols of the NPSS subframes by applying a portion of the cover code.

18. The apparatus of claim 17, wherein the portion of the cover code is a first half of the cover code.

19. An apparatus for wireless communication at a base station, comprising:
- means for constructing a Discovery Reference Signal (DRS) comprising a first set of contiguous narrowband primary synchronization signal (NPSS) subframes followed by a second set of contiguous repeating narrowband secondary synchronization signal (NSSS) subframes, at least one of the first set of contiguous NPSS subframes or the second set of contiguous repeating NSSS subframes comprising a plurality of adjacent subframes; and
- means for transmitting the DRS on an anchor channel.

20. The apparatus of claim 19, wherein the DRS comprises fourteen symbols within each of the NPSS subframes or the NSSS subframes.

21. The apparatus of claim 19, wherein the DRS further comprises a swapped burst of the first set of contiguous NPSS subframes and the second set of contiguous repeating NSSS subframes, wherein the swapped burst comprises a third set of contiguous repeating NSSS subframes following the second set of contiguous repeating NSSS subframes and a fourth set of contiguous NPSS subframes following the third set of contiguous repeating NSSS subframes, and wherein respective quantities of subframes of the first set of contiguous NPSS subframes and the fourth set of contiguous NPSS subframes is the same and respective quantities of subframes of the second set of contiguous repeating NSSS subframes and the third set of contiguous repeating NSSS subframes is the same.

22. The apparatus of claim 19, further comprising: means for indicating a frame structure of the DRS based on a cyclic shift in the NSSS subframes.

23. The apparatus of claim 19, further comprising: means for applying a cover code to symbols of the NPSS subframes of the DRS.

24. The apparatus of claim 23, wherein the cover code is not applied to the NSSS subframes of the DRS.

25. The apparatus of claim 23, wherein the cover code has a length to cover at least a product of a quantity of the NPSS subframes and a quantity of symbols in each of the NPSS subframes.

26. The apparatus of claim 23, further comprising: means for applying the cover code to the symbols of the NPSS subframes by applying a portion of the cover code.

27. The apparatus of claim 26, wherein the portion of the cover code is a first half of the cover code.

28. A non-transitory, computer-readable medium storing computer executable code, comprising code to:
- construct a Discovery Reference Signal (DRS) comprising a first set of contiguous narrowband primary synchronization signal (NPSS) subframes followed by a second set of contiguous repeating narrowband secondary synchronization signal (NSSS) subframes, at least one of the first set of contiguous NPSS subframes or the second set of contiguous repeating NSSS subframes comprising a plurality of adjacent subframes; and
- transmit the DRS on an anchor channel.

29. The computer-readable medium of claim 28, wherein the DRS comprises fourteen symbols within each of the NPSS subframes or the NSSS subframes.

30. The computer-readable medium of claim 28, wherein the DRS further comprises a swapped burst of the first set of contiguous NPSS subframes and the second set of contiguous repeating NSSS subframes, wherein the swapped burst comprises a third set of contiguous repeating NSSS subframes following the second set of contiguous repeating NSSS subframes and a fourth set of contiguous NPSS subframes following the third set of contiguous repeating NSSS subframes, and wherein respective quantities of subframes of the first set of contiguous NPSS subframes and the fourth set of contiguous NPSS subframes is the same and respective quantities of subframes of the second set of contiguous repeating NSSS subframes and the third set of contiguous repeating NSSS subframes is the same.

* * * * *